United States Patent
Kwak et al.

(10) Patent No.: US 12,501,243 B2
(45) Date of Patent: Dec. 16, 2025

(54) METHOD BY WHICH FIRST SERVER TRANSMITS SECOND MESSAGE IN WIRELESS COMMUNICATION SYSTEM, AND DEVICE THEREFOR

(71) Applicant: LG Electronics Inc., Seoul (KR)

(72) Inventors: Minsung Kwak, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 370 days.

(21) Appl. No.: 18/028,102

(22) PCT Filed: Oct. 7, 2021

(86) PCT No.: PCT/KR2021/013779
§ 371 (c)(1),
(2) Date: Mar. 23, 2023

(87) PCT Pub. No.: WO2022/075769
PCT Pub. Date: Apr. 14, 2022

(65) Prior Publication Data
US 2023/0336953 A1 Oct. 19, 2023

(30) Foreign Application Priority Data

Oct. 7, 2020 (KR) .......... 10-2020-0129490
Oct. 7, 2020 (KR) .......... 10-2020-0129517
Oct. 7, 2020 (KR) .......... 10-2020-0129538

(51) Int. Cl.
*H04W 4/40* (2018.01)
*H04L 67/566* (2022.01)
*H04W 4/12* (2009.01)

(52) U.S. Cl.
CPC ............ *H04W 4/40* (2018.02); *H04L 67/566* (2022.05); *H04W 4/12* (2013.01)

(58) Field of Classification Search
None
See application file for complete search history.

(56) References Cited

U.S. PATENT DOCUMENTS

| 10,080,124 B2* | 9/2018 | Tan .......... H04W 4/80 |
| 2010/0153578 A1* | 6/2010 | Van Gassel ......... H04L 65/65 |
| | | 709/231 |

(Continued)

FOREIGN PATENT DOCUMENTS

| KR | 10-2015-0026624 A | 3/2015 |
| KR | 10-2020-0089959 A | 7/2020 |
| WO | 2019/224124 A1 | 11/2019 |

OTHER PUBLICATIONS

3GPP TR23.776 V0.2.0 (Sep. 2020), 3rd Generation Partnership Project Technical Specification Group Services and System Aspects, Study on architecture enhancements for 3GPP support of advanced Vehicle-to-Everything (V2X) services; Phase 2 (Release 17), Sep. 2020, 25 pages.

(Continued)

*Primary Examiner* — Adolf Dsouza
(74) *Attorney, Agent, or Firm* — Fish & Richardson P.C.

(57) ABSTRACT

A first sever receives a plurality of vulnerable road user (VRU) messages; transmits a first message to a second server on the basis of VRU information obtained from the plurality of VRU messages; and transmits, to VRU devices, a second message including second cluster information based on the first message including first cluster information, wherein, based on a presence of VRU messages satisfying cluster conditions among the plurality of VRU messages, the first message includes the first cluster information for a cluster formed for the VRU messages, and the second cluster information includes information on a first cluster (Continued)

region for the cluster, and information on an expected time and a second cluster region associated with the expected time.

12 Claims, 31 Drawing Sheets

(56) References Cited

U.S. PATENT DOCUMENTS

2013/0267239 A1* 10/2013 Stancanelli ............ H04B 7/024
 455/452.1
2019/0320380 A1 10/2019 Nylander et al.

OTHER PUBLICATIONS

Office Action in Korean Appln. No. 10-2023-7010059, mailed on Mar. 25, 2025, 16 pages.

* cited by examiner (a)

(b)

(a)

(b)

METHOD BY WHICH FIRST SERVER TRANSMITS SECOND MESSAGE IN WIRELESS COMMUNICATION SYSTEM, AND DEVICE THEREFOR

CROSS-REFERENCE TO RELATED APPLICATIONS

This application is a National Stage application under 35 U.S.C. § 371 of International Application No. PCT/KR2021/013779, filed on Oct. 7, 2021, which claims the benefit of Korean Application Nos. 10-2020-0129538, filed on Oct. 7, 2020, 10-2020-0129490, filed on Oct. 7, 2020, and 10-2020-0129517, filed on Oct. 7, 2020. The disclosures of the prior applications are incorporated by reference in their entirety.

TECHNICAL FIELD

The present disclosure relates to a method by which a first server transmits a second message related to clustering of vulnerable road user (VRU) messages based on predetermined cluster conditions in a wireless communication system and apparatus therefor.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between UEs without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

SUMMARY

The object of the present disclosure is to provide a method and apparatus for minimizing the amount of data exchanged between servers by reconfiguring a plurality of messages based on clustering and minimizing the amount of data exchanged between a server and user equipments (UEs) based on interaction between the server and UEs in order to improve communication environments and minimize battery consumption of the UEs.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following

DETAILED DESCRIPTION

Technical Solution

In an aspect of the present disclosure, there is provided a method of transmitting, by a first server, a second message in a wireless communication system. The method may include: receiving a plurality of vulnerable road user (VRU) messages; transmitting a first message to a second server based on VRU information obtained from the plurality of VRU messages; and transmitting the second message including second cluster information to VRU devices based on the first message including first cluster information. When there are VRU messages satisfying cluster conditions among the plurality of VRU messages, the first message may include the first cluster information on a cluster formed based on the VRU messages. The second cluster information may include information on a first cluster area of the cluster and information on an expected time and a second cluster area related to the expected time.

Alternatively, the expected time may be to specify a period during which VRU devices located in the first cluster area stop transmitting VRU messages.

Alternatively, the second cluster information may further include information on a reference position for specifying a representative VRU device configured to transmit a cluster message as a representative of VRU devices located in the first cluster area.

Alternatively, the first cluster information may be updated based on the cluster message transmitted by the representative VRU device.

Alternatively, the cluster message may include cluster information related to the second cluster area and be received at a point in time corresponding to the expected time.

Alternatively, the second cluster area may be an area related to determining whether the VRU devices resume transmission of VRU messages after the expected time.

Alternatively, when a number of VRU messages each including information on a position within a predetermined threshold distance is greater than or equal to a cluster threshold number, the first cluster area may be configured based on position information in the VRU messages.

Alternatively, the first message may be an advanced message queuing protocol (AMQP) message exchanged between servers.

Alternatively, the first server may be configured to specify the second server to which the first server is to transmit the first message, based on clustering request messages received from a plurality of servers connected to the first server.

Alternatively, the first message may not be transmitted to a server transmitting a request message for a cluster area different from the first cluster area among the plurality of servers.

In another aspect of the present disclosure, there is provided a method of receiving, by a VRU device, cluster information from a first server in a wireless communication system. The method may include: transmitting a VRU message to the first server; receiving a second message including the cluster information from the first server; and stopping the transmission of the VRU message based on the cluster information. The cluster information may include information on a first cluster area configured based on predetermined cluster conditions and information on an expected time and a second cluster area related to the expected time. When the VRU device is located within the first cluster area, the transmission of the VRU message may stop until the expected time.

In another aspect of the present disclosure, there is provided a first server configured to transmit a second message in a wireless communication system. The first server may include: a radio frequency (RF) transceiver; and a processor connected to the RF transceiver. The processor may be configured to: control the RF transceiver to receive a plurality of VRU messages; transmit a first message to a second server based on VRU information obtained from the plurality of VRU messages; and transmit the second message including second cluster information to VRU devices based on the first message including first cluster information. When there are VRU messages satisfying cluster conditions among the plurality of VRU messages, the first message may include the first cluster information on a cluster formed based on the VRU messages. The second cluster information may include information on a first cluster area of the cluster and information on an expected time and a second cluster area related to the expected time.

In another aspect of the present disclosure, there is provided a VRU device configured to receive cluster information from a first server in a wireless communication system. The VRU device may include: an RF transceiver; and a processor connected to the RF transceiver. The processor may be configured to: control the RF transceiver to transmit a VRU message to the first server; receive a second message including the cluster information from the first server; and stop the transmission of the VRU message based on the cluster information. The cluster information may include information on a first cluster area configured based on predetermined cluster conditions and information on an expected time and a second cluster area related to the expected time. When the VRU device is located within the first cluster area, the transmission of the VRU message may stop until the expected time.

In another aspect of the present disclosure, there is provided a chipset configured to transmit a second message in a wireless communication system. The chipset may include: at least one processor; and at least one memory operably connected to the at least one processor and configured to, when executed, cause the at least one processor to perform operations. The operations may include: receiving a plurality of VRU messages; transmitting a first message to a second server based on VRU information obtained from the plurality of VRU messages; and transmitting the second message including second cluster information to VRU devices based on the first message including first cluster information. When there are VRU messages satisfying cluster conditions among the plurality of VRU messages, the first message may include the first cluster information on a cluster formed based on the VRU messages. The second cluster information may include information on a first cluster area of the cluster and information on an expected time and a second cluster area related to the expected time.

In a further aspect of the present disclosure, there is provided a computer-readable storage medium including at least one computer program configured to cause at least one processor to transmit a second message in a wireless communication system. The at least one computer program may be configured to cause the at least one processor to perform operations of transmitting the second message, and the at least one computer program may be stored on the computer-readable storage medium. The operations may include: receiving a plurality of VRU messages; transmitting a first message to a second server based on VRU information obtained from the plurality of VRU messages; and transmitting the second message including second cluster information to VRU devices based on the first message including first cluster information. When there are VRU messages satisfying cluster conditions among the plurality of VRU messages, the first message may include the first cluster information on a cluster formed based on the VRU messages. The second cluster information may include information on a first cluster area of the cluster and information on an expected time and a second cluster area related to the expected time.

Advantageous Effects

According to various embodiments, the amount of data exchanged between servers may be minimized by reconfiguring a plurality of messages based on clustering, and the amount of data exchanged between a server and user equipments (UEs) may also be minimized based on interaction between the server and UEs, thereby improving communication environments and minimizing battery consumption of the UEs.

Effects to be achieved by embodiment(s) are not limited to what has been particularly described hereinabove and other effects not mentioned herein will be more clearly understood by persons skilled in the art to which embodiment(s) pertain from the following detailed description.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

DETAILED DESCRIPTION

Figure 1:
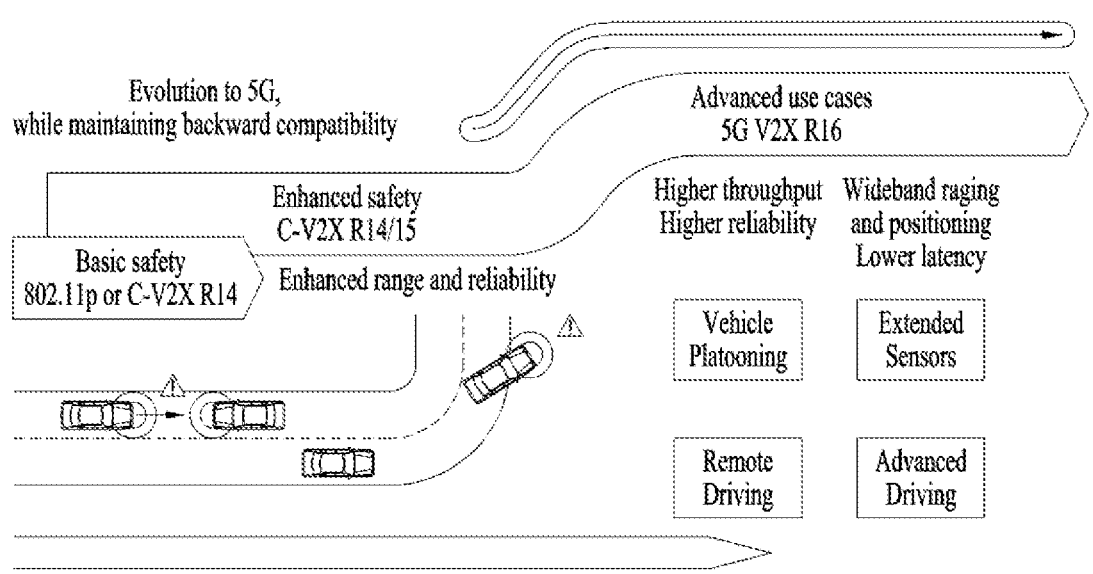
FIG. 1 is a diagram for explaining by comparing V2X communication based on RAT before NR and V2X communication based on NR.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
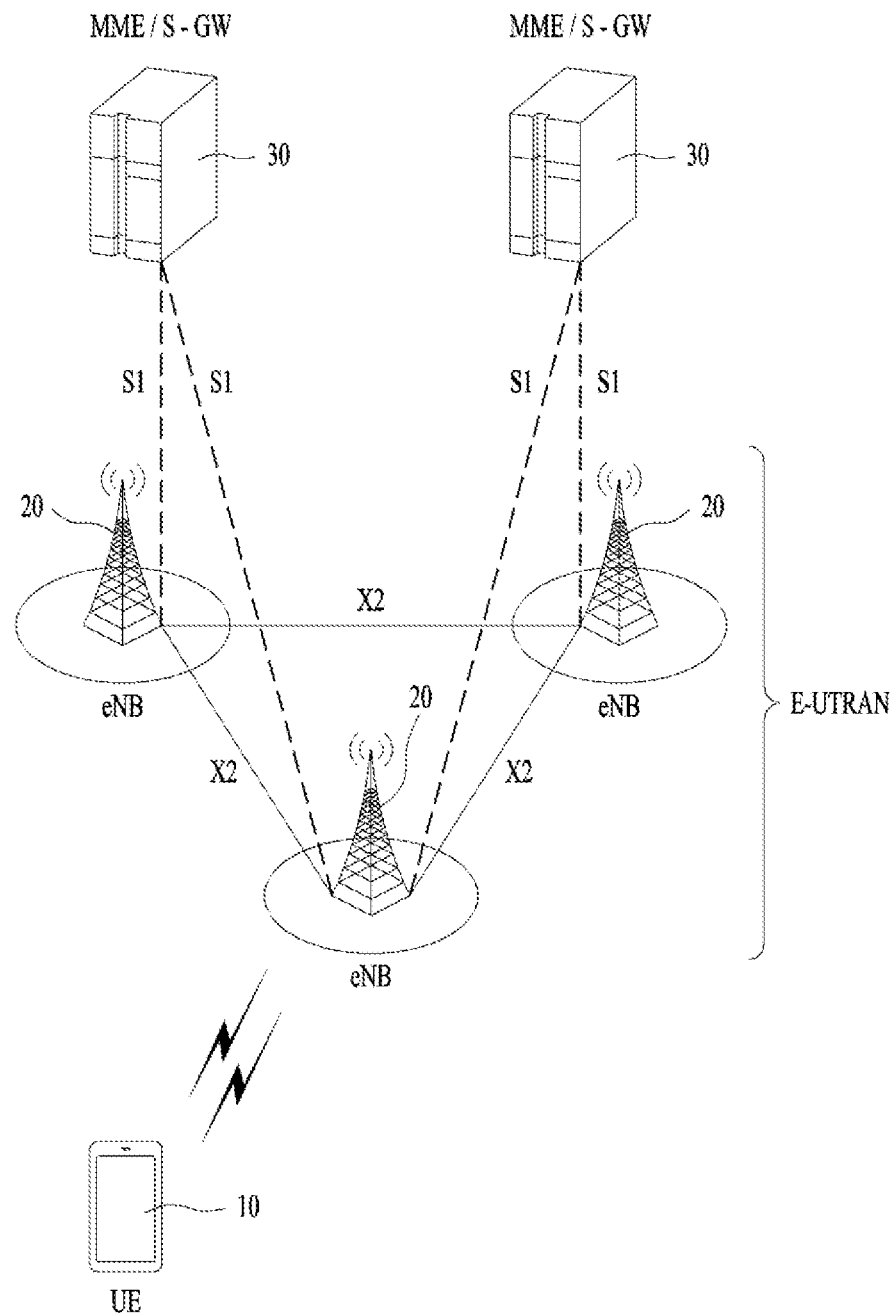
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user UE (UT), subscriber station (SS), mobile UE (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
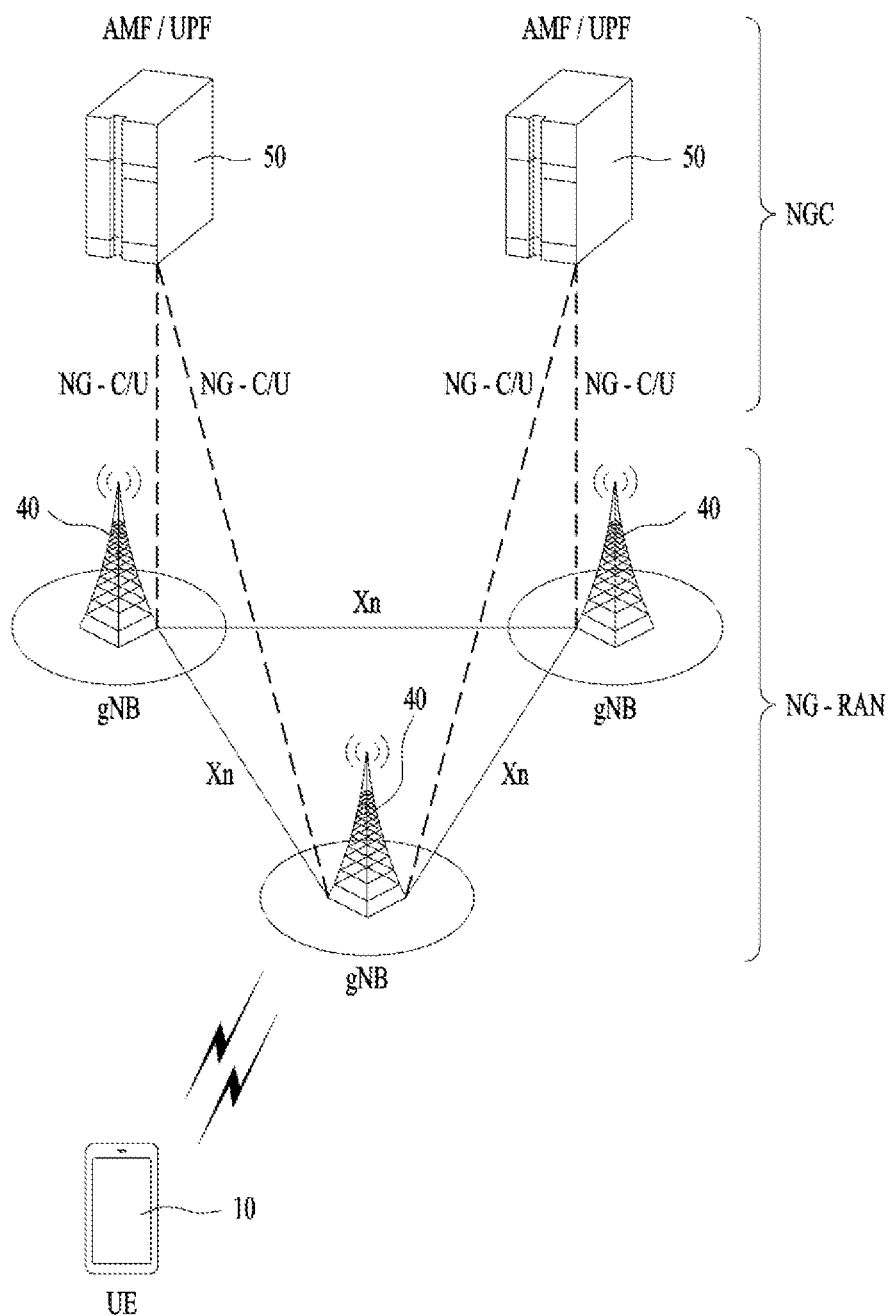
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
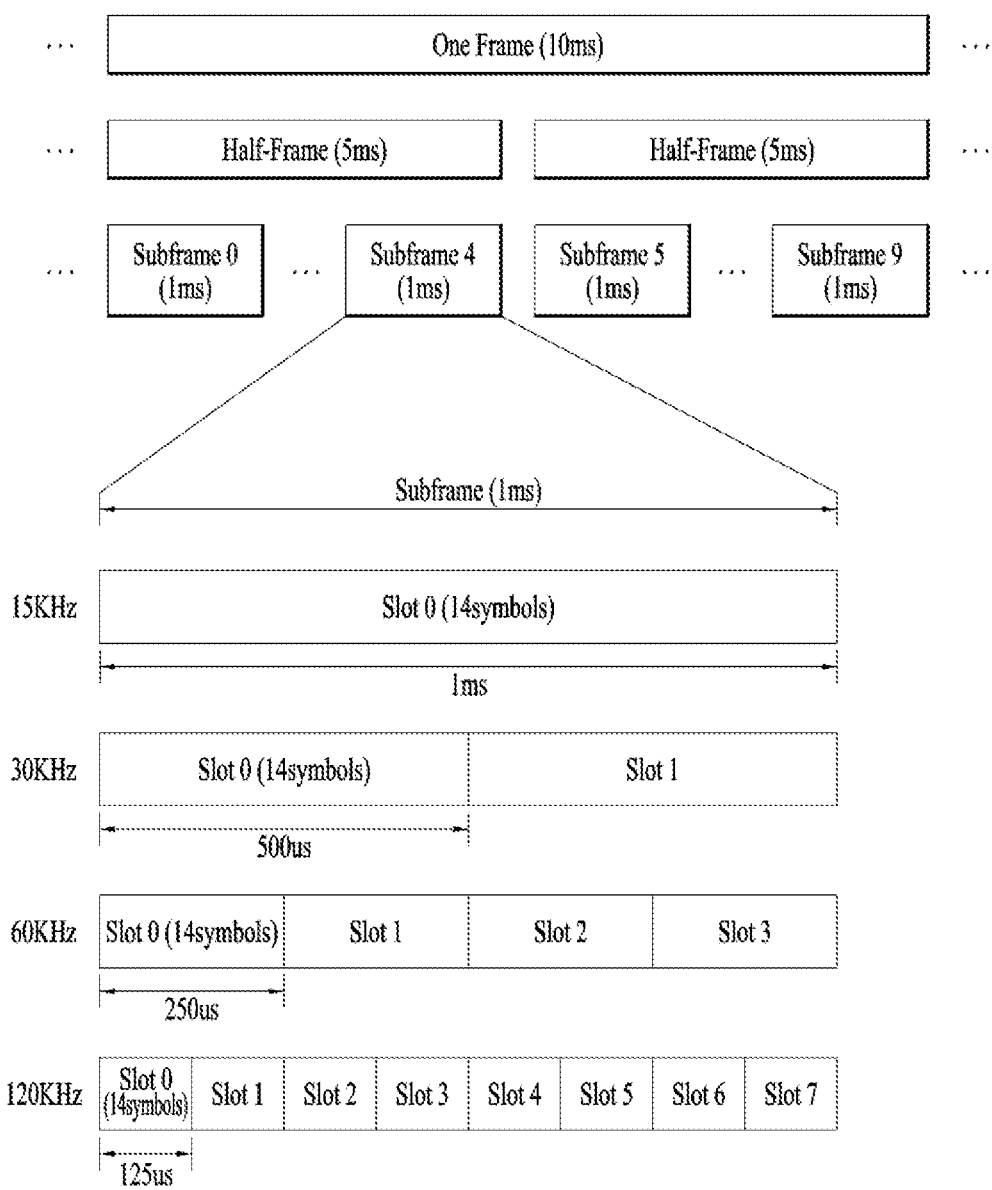
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot Nslotsymb, the number of slots per frame Nframe,uslot, and the number of slots per subframe Nsubframe,uslot according to an SCS configuration μ in the NCP case.

TABLE 1

| SCS (15 * 2u) | $N^{slot}_{symb}$ | $N^{frame,u}_{slot}$ | $N^{subframe,u}_{slot}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

Table 2 below lists the number of symbols per slot, the number of slots per frame, and the number of slots per subframe according to an SCS in the ECP case.

TABLE 2

| SCS (15 * 2^u) | $N^{slot}_{symb}$ | $N^{frame,u}_{slot}$ | $N^{subframe,u}_{slot}$ |
|---|---|---|---|
| 60 kHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
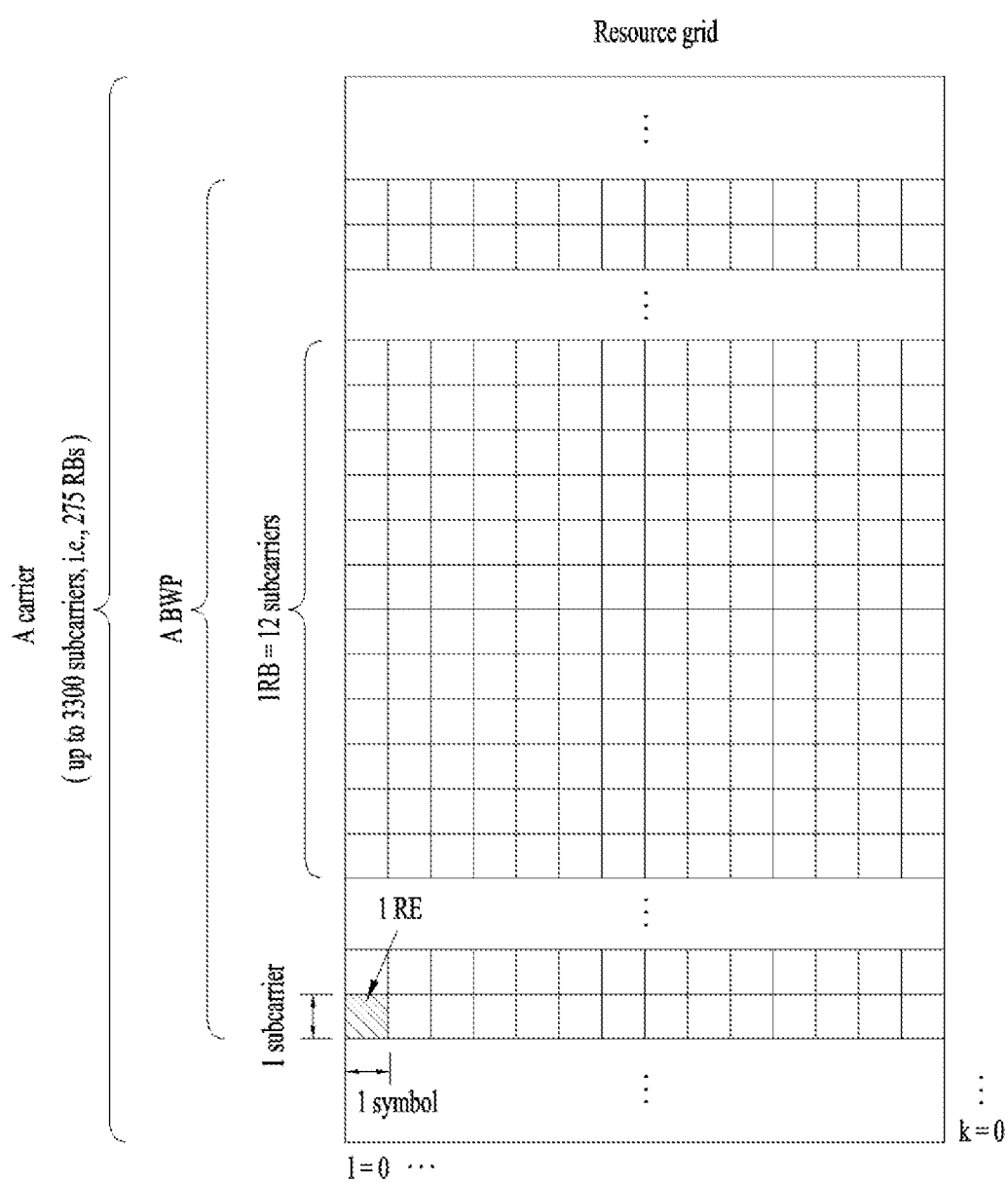
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
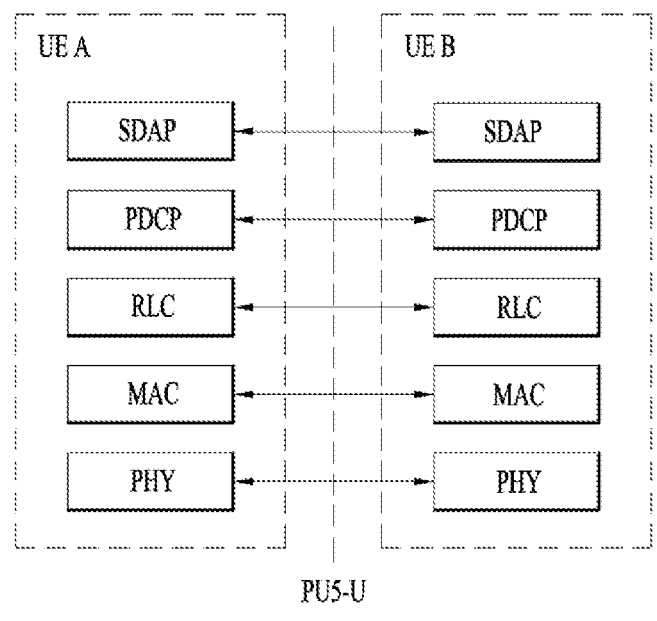
FIG. 6 illustrates a radio protocol architecture for SL communication.
Figure 6:
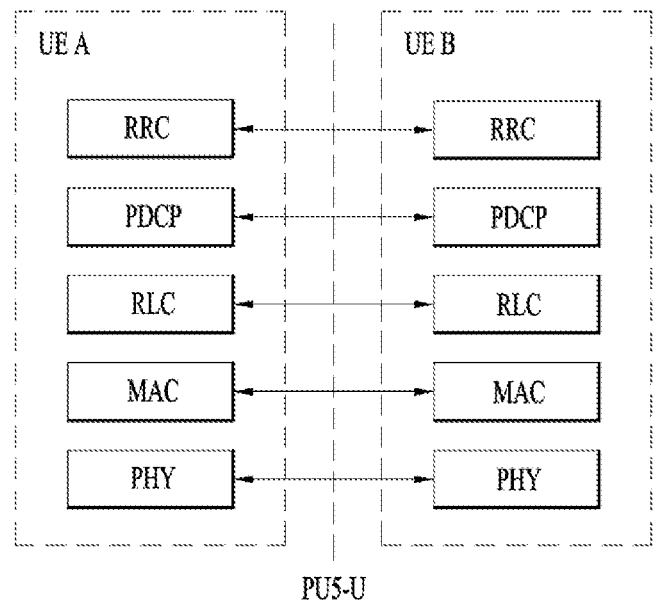

FIG. 6 illustrates a radio protocol architecture for SL communication. Specifically, FIG. 6-(a) shows a user plane protocol stack of NR, and FIG. 6-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be preconfigured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
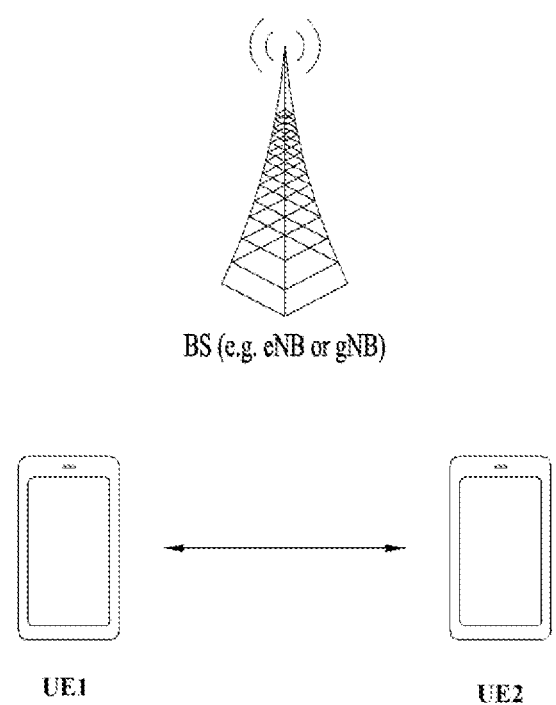
FIG. 7 illustrates UEs performing V2X or SL communication.

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
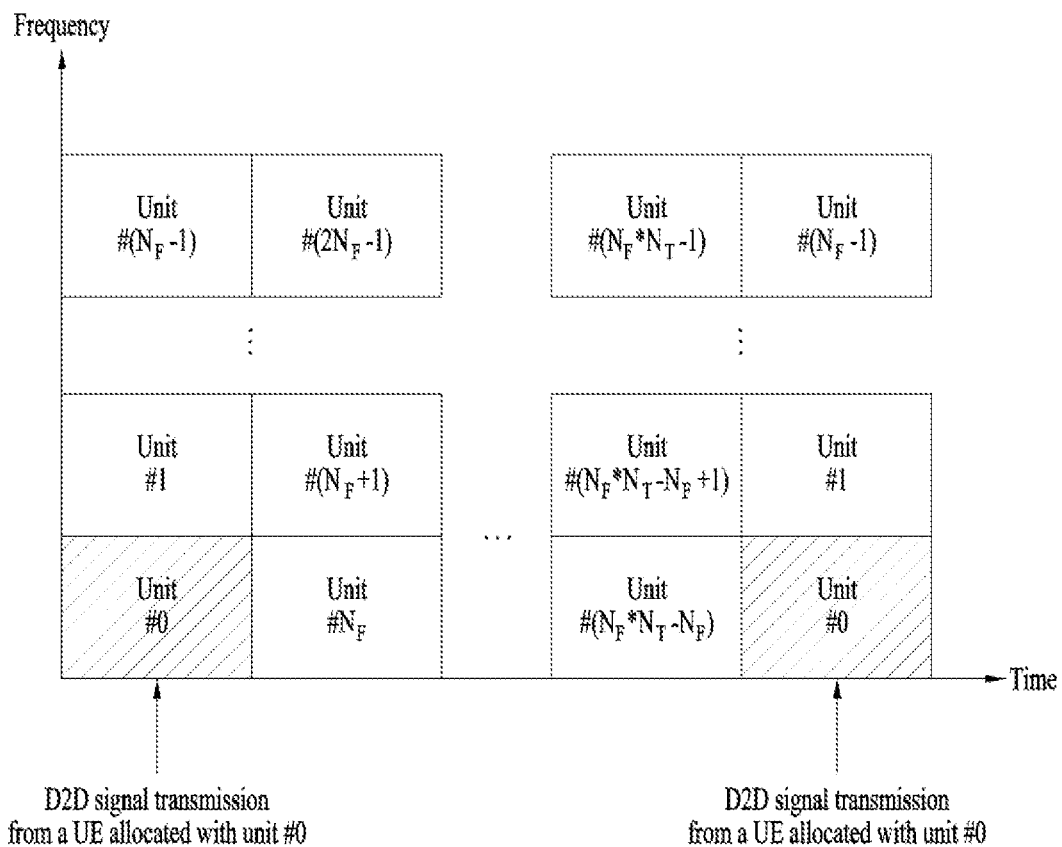
FIG. 8 illustrates resource units for V2X or SL communication.

FIG. 8 illustrates resource units for V2X or SL communication.

Referring to FIG. 8, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Vehicular Communications for ITS

An intelligent transport system (ITS) utilizing vehicle-to-everything (V2X) may mainly include an access layer, a network & transport layer, a facilities layer, an application layer, security and management entities, etc. Vehicle communication may be applied to various scenarios such as vehicle-to-vehicle communication (V2V), vehicle-to-network communication (V2N or N2V), vehicle-to-road side unit (RSU) communication (V2I or I2V), RSU-to-RSU communication (I2I), vehicle-to-pedestrian communication (V2P or P2V), and RSU-to-pedestrian communication (I2P or P2I). A vehicle, a BS, an RSU, a pedestrian, etc. as the subjects of vehicle communication are referred to as ITS stations.

Figure 9:
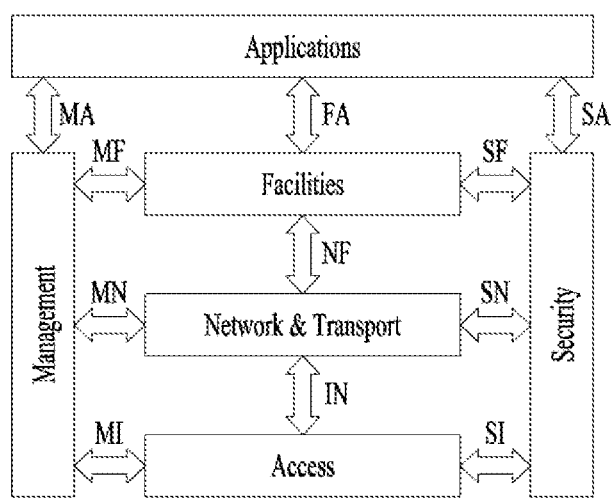
FIG. 9 is a diagram for explaining an ITS station reference architecture.

FIG. 9 is a diagram for explaining an ITS station reference architecture.

The ITS station reference architecture may include an access layer, a network & transport layer, a facilities layer, entities for security and management, and an application layer at the top. Basically, the ITS station reference architecture follows a layered OSI model.

Specifically, features of the ITS station reference architecture based on the OSI model are illustrated in FIG. 9. The access layer of the ITS station corresponds to OSI layer 1 (physical layer) and layer 2 (data link layer), the network & transport layer of the ITS station corresponds to OSI layer 3 (network layer) and layer 4 (transport layer), and the facilities layer of the ITS station corresponds to OSI layer 5 (session layer), layer 6 (presentation layer), and layer 7 (application layer).

The application layer, which is located at the highest layer of the ITS station, may actually implement and support a use-case and may be selectively used according to the use-case. The management entity serves to manage all layers in addition to managing communication and operations of the ITS station. The security entity provides security services for all layers. Each layer of the ITS station exchanges data transmitted or received through vehicle communication and additional information for various purposes through an interface. The abbreviations of various interfaces are described below.

MA: Interface between management entity and application layer

MF: Interface between management entity and facilities layer

MN: Interface between management entity and networking & transport layer

MI: Interface between management entity and access layer

FA: Interface between facilities layer and ITS-S applications

NF: Interface between networking & transport layer and facilities layer

IN: Interface between access layer and networking & transport layer

SA: Interface between security entity and ITS-S applications

SF: Interface between security entity and facilities layer

SN: Interface between security entity and networking & transport layer

SI: Interface between security entity and access layer

Figure 10:
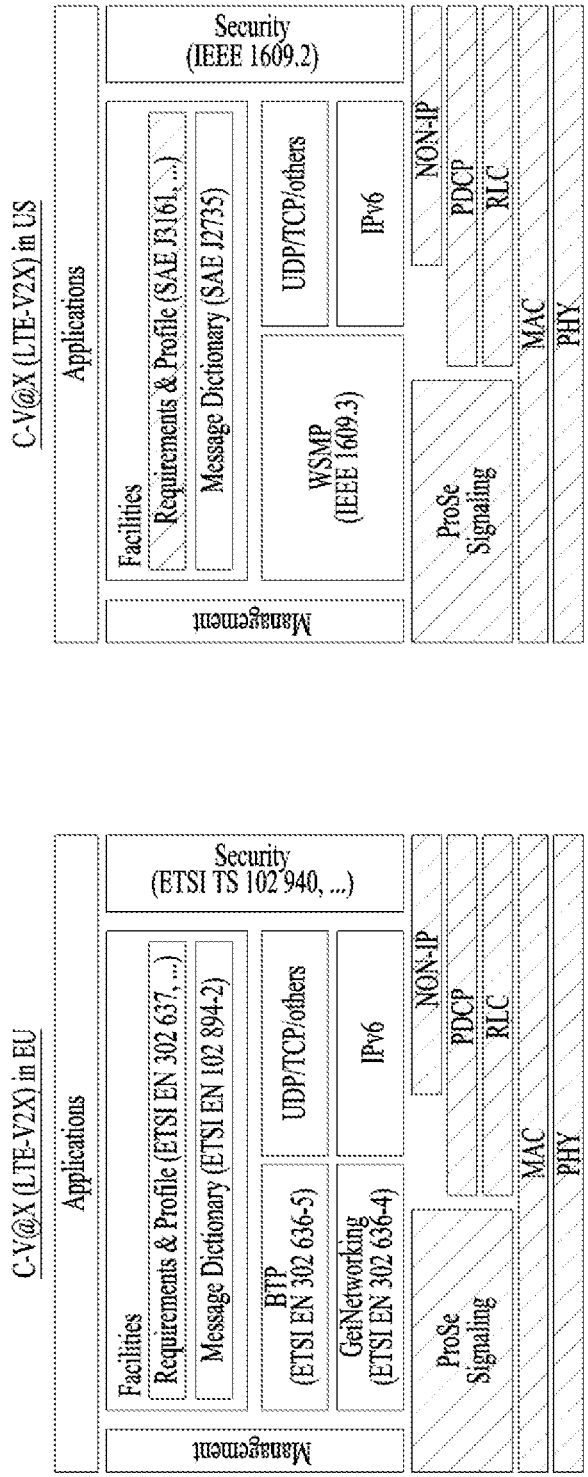
FIG. 10 illustrates an exemplary structure of an ITS station that may be designed and applied based on a reference architecture.

FIG. 10 illustrates an exemplary structure of an ITS station that may be designed and applied based on a reference architecture.

A main concept of the ITS station reference architecture is to allow each layer with a special function to process communication on a layer basis, between two end vehicles/users included in a communication network. That is, when a V2V message is generated, the data is passed through each layer downwards layer by layer in the vehicle and the ITS system (or other ITS-related UEs/systems), and a vehicle or ITS system (or other ITS-related UEs/systems) receiving the message passes the message upwards layer by layer.

The ITS system operating through vehicle communication and the network was organically designed in consideration of various access technologies, network protocols, communication interfaces, etc. to support various use-cases, and the roles and functions of each layer described below may be changed depending on a situation. The main functions of each layer will be briefly described.

The application later actually implements and supports various use-cases. For example, the application layer provides security, efficient traffic information, and other entertainment information.

The application layer controls an ITS station to which an application belongs in various manners or provides services by transferring a service message to an end vehicle/user/infrastructure through the access layer, the network & transport layer, and the facilities layer, which are lower layers of the application layer, by vehicle communication. In this case, the ITS application may support various use-cases. In general, these use-cases may be supported by grouping into other applications such as road-safety, traffic efficiency, local services, and infotainment. Application classification, use-cases, etc. may be updated when a new application scenario is defined. Layer management serves to manage and service information related to operation and security of the application layer, and the related information is transmitted and shared bidirectionally through an MA and an SA (or service access point (SAP), e.g. MA-SAP or SA-SAP). A request from the application layer to the facilities layer or a service message and related information from the facilities layer to the application layer may be delivered through an FA.

The facilities layer serves to support effective implementation of various use-cases defined in an application layer of a higher layer. For example, the facilities layer may perform application support, information support, and session/communication support.

The facilities layer basically supports the 3 higher layers of the OSI model, for example, a session layer, a presentation layer, and the application layer, and functions. Specifically, the facilities layer provides facilities such as application support, information support, and session/communication support, for the ITS. Here, the facilities mean components that provide functionality, information, and data.

The application support facilities support the operation of ITS applications (mainly generation of a message for the ITS, transmission and reception of the message to and from a lower layer, and management of the message). The application support facilities include a cooperative awareness (CA) basic service and a decentralized environmental notification (DEN) basic service. In the future, facilities entities for new services such as cooperative adaptive cruise control (CACC), platooning, a vulnerable roadside user (VRU), and a collective perception service (CPS), and related messages may be additionally defined.

The information support facilities provide common data information or a database to be used by various ITS applications and includes a local dynamic map (LDM).

The session/communication support facilities provide services for communications and session management and include an addressing mode and session support.

Facilities may be divided into common facilities and domain facilities.

The common facilities are facilities that provide common services or functions required for various ITS applications and ITS station operations, such as time management, position management, and service management.

The domain facilities are facilities that provide special services or functions required only for some (one or more) ITS applications, such as a DEN basic service for road hazard warning applications (RHW). The domain facilities are optional functions and are not used unless supported by the ITS station.

Layer management serves to manage and service information related to the operation and security of the facilities layer, and the related information is transmitted and shared bidirectionally through an MF and an SF (or MF-SAP and SF-SAP). The transfer of service messages and related information from the application layer to the facilities layer or from the facilities layer to the application layer is performed through an FA (or FA-SAP), and bidirectional service messages and related information between the facilities layer and the lower networking & transport layer are transmitted by an NF (or NF-SAP).

The network & transport layer servers to configure a network for vehicle communication between homogenous or heterogeneous networks through support of various transport protocols and network protocols. For example, the network & transport layer may provide Internet access, routing, and vehicle networking using Internet protocols such as TCP/UDP+IPv6 and form a vehicle network using a basic transport protocol (BTP) and GeoNetworking-based protocols. In this case, networking using geographic position information may also be supported. A vehicle network layer may be designed or configured depending on technology used for the access layer (access layer technology-independently) or regardless of the technology used for the access layer (access layer technology-independently or access layer technology agnostically).

Functionalities of the European ITS network & transport layer are as follows. Basically, functionalities of the ITS network & transport layer are similar to or identical to those of OSI layer 3 (network layer) and layer 4 (transport layer) and have the following characteristics.

Figure 11:
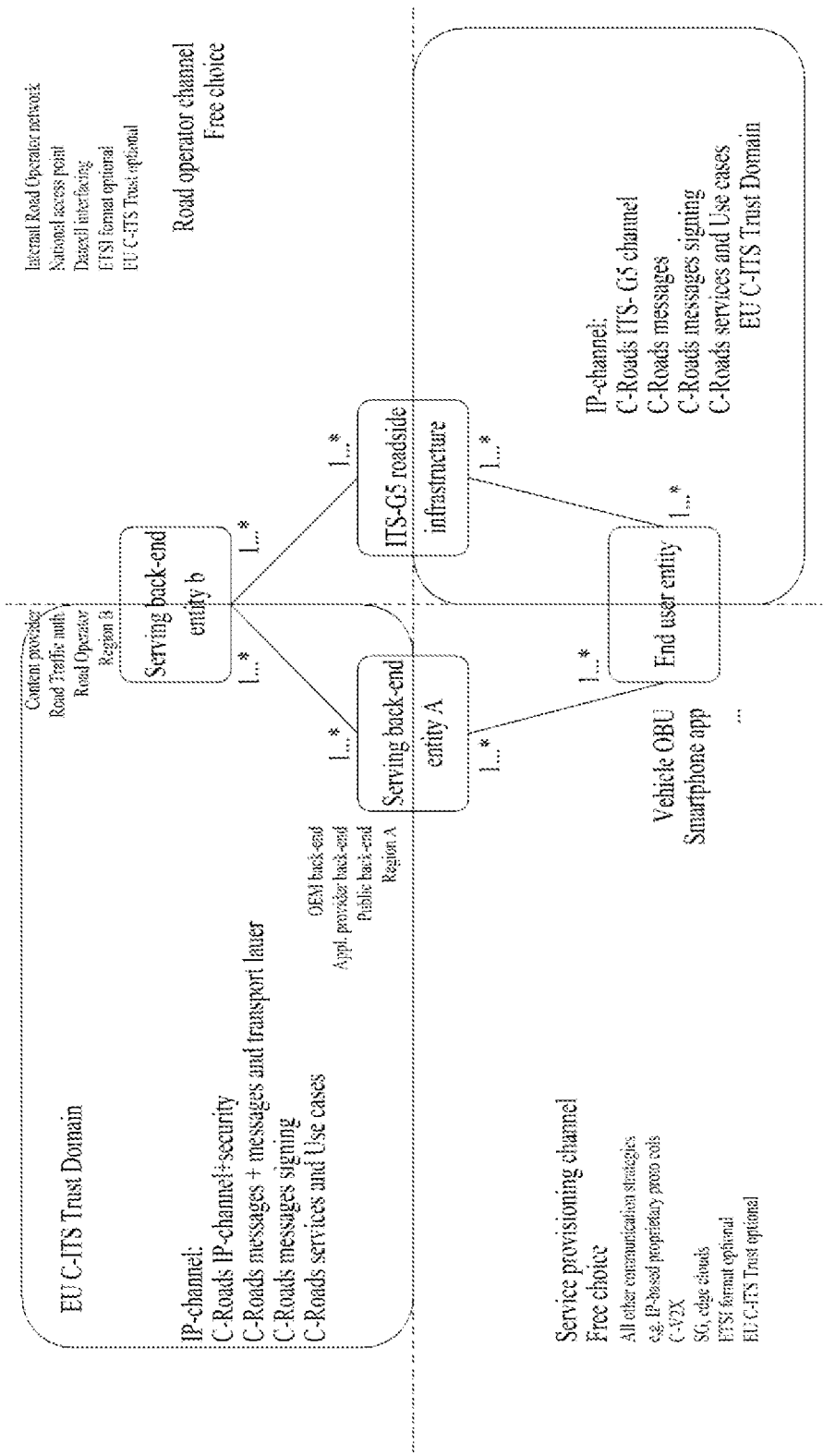
FIGS. 11 and 12 are diagrams for explaining relationships between entities in C-Roads.

The transport layer is a connection layer that delivers service messages and related information received from higher layers (the session layer, the presentation layer, and the application layer) and lower layers (the network layer, the data link layer, and the physical layer). The transport layer serves to manage data transmitted by an application of the ITS station so that the data accurately arrives at an application process of the ITS station as a destination. Transport protocols that may be considered in European ITS include, for example, TCP and UDP used as legacy Internet protocols as illustrated in FIG. 11, and there are transport protocols only for the ITS, such as the BTS.

The network layer serves to determine a logical address and a packet forwarding method/path, and add information such as the logical address of a destination and the forwarding path/method to a header of the network layer in a packet received from the transport layer. As an example of the packet method, unicast, broadcast, and multicast between ITS stations may be considered. Various networking protocols for the ITS may be considered, such as GeoNetworking, IPv6 networking with mobility support, and IPv6 over GeoNetworking. In addition to simple packet transmission, the GeoNetworking protocol may apply various forwarding paths or transmission ranges, such as forwarding using position information about stations including vehicles or forwarding using the number of forwarding hops.

Layer management related to the network & transport layer serves to manage and provide information related to the operation and security of the network & transport layer, and the related information is transmitted and shared bidirectionally through an MN (or MN-SAP) and an SN (or SN-SAP). Transmission of bidirectional service messages and related information between the facilities layer and the networking & transport layer is performed by an NF (or NF-SAP), and service messages and related information between the networking & transport layer and the access layer are exchanged by an IN (or IN-SAP).

A North American ITS network & transport layer supports IPv6 and TCP/UDP to support existing IP data like Europe, and a wave short message protocol (WSMP) is defined as a protocol only for the ITS.

A packet structure of a wave short message (WSM) generated according to the WSMP includes a WSMP header and WSM data carrying a message. The WSMP header includes Version, PSID, WSMP header extension fields, WSM WAVE element ID, and Length.

Version is defined by a WsmpVersion field indicating an actual WSMP version of 4 bits and a reserved field of 4 bits. PSID is a provider service identifier, which is allocated according to an application in a higher layer and helps a receiver to determine an appropriate higher layer. Extension fields is a field for extending the WSMP header, and includes information such as a channel number, a data rate, and transmit power used. WSMP WAVE element ID specifies the type of a WSM to be transmitted. Length specifies the length of transmitted WSM data in octets through a WSMLength field of 12 bits, and the remaining 4 bits are reserved. LLC Header allows IP data and WSMP data to be transmitted separately and is distinguished by Ethertype of a SNAP. The structures of the LLC header and the SNAP header are defined in IEEE802.2. When IP data is transmitted, Ethertype is set to 0x86DD in the LLC header. When WSMP is transmitted, Ethertype is set to 0x88DC in the LLC header. The receiver identifies Ethertype. If Ethertype is 0x86DD, the receiver transmits upward the packet to an IP data path, and if Ethertype is 0x88DC, the receiver transmits upward the packet to a WSMP path.

The access layer serves to transmit a message or data received from a higher layer on a physical channel. As access layer technologies, ITS-G5 vehicle communication technology based on IEEE 802.11p, satellite/broadband wireless mobile communication technology, 2G/3G/4G (long-term evolution (LTE), etc.)/5G wireless cellular communication technology, cellular-V2X vehicle-dedicated communication technologies such as LTE-V2X and NR-V2X (new radio), broadband terrestrial digital broadcasting technology such as DVB-T/T2/ATSC3.0, and GPS technology may be applied.

A data link layer is a layer that converts a physical line between adjacent nodes (or between vehicles) with noise into a communication channel without transmission error, for use in the higher network layer. The data link layer performs a function of transmitting/delivering/forwarding L3 protocols, a framing function of dividing data to be transmitted into packets (or frames) as transmission units and grouping the packets, a flow control function of compensating for a speed difference between a transmitter and a receiver, and a function of (because there is a high probability that an error and noise occurs randomly in view of the nature of a physical transmission medium) detecting a transmission error and correcting the error or detecting a transmission error based on a timer and an ACK signal by a transmitter in a method such as automatic repeat request (ACK) and retransmitting a packet that has not been correctly received. In addition, to avoid confusion between packets or ACK signals, the data link layer performs a function of assigning a sequence number to the packets and the ACK signals, and a function of controlling establishment, maintenance, and disconnection of a data link between network entities, and data transmission between network entities. The main functions of logical link control (LLC), radio resource control (RRC), packet data convergence protocol (PDCP), radio link control (RLC), medium access control (MAC), and multi-channel operation (MCO) included in the data link layer of FIG. 11 will be described below.

An LLC sub-layer enables the use of different lower MAC sub-layer protocols, and thus enables communication regardless of network topology. An RRC sub-layer performs functions such as broadcasting of cell system information required for all UEs within a cell, management of delivery of paging messages, management (setup/maintenance/release) of RRC connection between a UE and an E-UTRAN, mobility management (handover), transmission of UE context between eNodeBs during handover, UE measurement reporting and control therefor, UE capability management, temporary assignment of a cell ID to a UE, security management including key management, and RRC message encryption. A PDCP sub-layer may performs functions such as IP packet header compression in a compression method such as robust header compression (ROHC), cyphering of a control message and user data, data integrity, and data loss prevention during handover. RLC sub-layer delivers a packet received from the higher PDCP layer in an allowed size of the MAC layer through packet segmentation/concatenation, increases data transmission reliability by transmission error and retransmission management, checks the order of received data, reorders data, and checks redundancy. A MAC sub-layer performs functions such as control of the occurrence of collision/contention between nodes for use of shared media among multiple nodes, matching a packet delivered from the higher layer to a physical layer frame format, assignment and identification of the address of the transmitter/receiver, detection of a carrier, collision detection, and detection of obstacles on the physical medium. An MCO sub-layer enables efficient provision of various services on a plurality of frequency channels. The main function of MCO sub-layer is to effectively distribute traffic load of a specific frequency channel to other channels to minimize collision/contention of communication information between vehicles in each frequency channel.

The physical layer is the lowest layer in the ITS layer architecture. The physical layer defines an interface between a node and a transmission medium and performs modulation, coding, and mapping of a transport channel to a physical channel, for bit transmission between data link layer entities and informs the MAC sub-layer of whether a wireless medium is busy or idle by carrier sensing or clear channel assessment (CCA).

A SoftV2X system may be a system in which a SoftV2X server receives a VRU message or a personal safety message (PSM) from a vulnerable road user (VRU) or a V2X vehicle and transfers information on a neighbor VRU or vehicle based on the VRU message or the PSM message or may analyze a road condition, etc. on which neighbor VRUs or vehicles move and may transmit a message informing a neighbor VRU or vehicle of a collision warning, etc. based on the analyzed information (e.g., through a downlink signal) via V2X communication using a UU interface. Here, the VRU message may be a message transmitted to the SoftV2X server through the UU interface, and may include mobility information about the VRU, such as a position, a movement direction, a movement path, and a speed of the VRU. That is, the SoftV2X system may use a method of receiving mobility information of VRUs and/or vehicles related to V2X communication through the UU interface and controlling a driving route or a VRU movement flow of the VRU, etc. based on the mobility information received by the softV2X server, such as a network. The SoftV2X system may be configured in relation to V2N communication.

User equipment or pedestrian equipment (VRU device) that is difficult to perform direct communication (PC5, DSRC) related to V2X communication can provide or receive driving information and mobility information to nearby vehicles or VRUs through the SoftV2X system based on the UU interface. Through this, the user equipment or pedestrian equipment (VRU device) that is difficult to perform the direct communication (PC5, DSRC) can be protected from surrounding vehicles.

C-Roads

Figure 12:
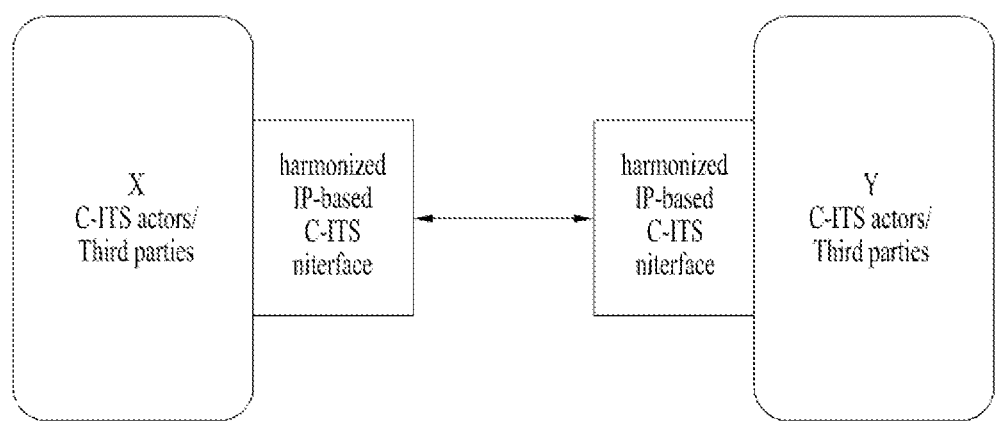

FIGS. 11 and 12 are diagrams for explaining relationships between entities in C-Roads.

Referring to FIGS. 11 and 12, cooperative intelligent transport systems (C-ITS) information obtained from an end-user entity or roadside infrastructure may be shared through an interconnection between back-end entity servers connected to each entity. In the prior art where the interoperability of backend hybrid C-ITS communication is defined, functions and profiles required for communication between serving back-end entity A and serving back-end entity B are defined as shown in FIG. 11.

In the prior art, one entity that shares information via an IP-based C-ITS interface is defined by the following term: C-ITS actor or third party. Typically, C-ITS actors operate on the basis of one country/region and maintain a connection between entities to share/consume information within the relevant region. The interface used to share information is defined as a basic interface (BI), which is defined independently of a deployment model selected by the C-ITS actor.

Here, the C-ITS actors may be entities or organizations that operate C-ITS stations or provide C-ITS services based on high-quality traffic information. An advanced message queuing protocol (AMQP) refers to a binary application layer protocol designed to efficiently support a variety of message applications and communication patterns. An AMQP message broker refers to an architectural pattern for message routing. To allow the AMQP message broker to mediate communication between applications for message exchange therebetween, decoupling may be effectively implemented by minimizing the mutual awareness that applications need to have of each other. The AMQP broker may be used to route C-ITS messages. The C-ITS message may be a signed message that is defined in the European Telecommunications Standards Institute (ETSI) and the International Organization for Standardization (ISO) and profiled to C-ROADS Roadside System Profile (RSP). Third parties may be any organizations contracted with the C-ITS actor.

In the prior art, functional requirements that the BI and C-ITS actors needs to have are defined, and the following shows the main requirements.

BI shall allow C-ITS actors to publish and subscribe to C-ITS messages.

BI shall allow to filter C-ITS messages according to filtering mechanism.
BI shall allow to route C-ITS messages
Filtering by AMQP brokers shall be done without reading the AMQP payload
A broker shall never remove, alter or add anything to a message payload
A broker shall never remove or alter any of the AMQP application properties field.
A broker should drop malformed AMQP messages that do not adhere to this specification or any extension of it and shall log the event The BI is an interface used between C-ITS actors, and the protocols and profiles of the BI defined in the prior art are as follows.

BI shall implement TLS 1.3.
BI shall use AMQP version 1.0.
Filtering mechanism focuses more on DENM and
All AMQP Clients and Brokers shall support filtering on application properties
All mandatory fields shall be present for publishing for all C-ITS messages.
Filtering shall be requested by consumer based on selected fields.
All AMQP messages with a DENM as payload exchanged in BI shall contain information Data fields used to filter all C-ITS messages may be defined as shown in Table 5. In Table 5, the underlined parts are data fields that may be included as options, and the remaining data fields are mandatory and need to be included in the Application Properties field of the AMQP message for filtering.

applied to two message types: DENM and IVIM (event messages based on triggering). However, the filtering mechanism used in the conventional BI protocol may not be applied or defined for the following message: CAM or VRU awareness message (VAM), where a number of messages are generated according to a predetermined cycle when message generation conditions are satisfied. If there is no filtering technique for the above message (e.g., CAM or VAM), the amount of data transfer of messages exchanged between back-end entities (e.g., C-ITS actors) may increase, and the storage capacity and processing speed of each entity may also be affected.

Hereinafter, a method of drastically reducing the amount of data transfer when a UE (e.g., VRU, VRU device, etc.) transmits and receives a message (e.g., VAM, CAM, etc.) for awareness of the UE between two servers will be described. In other words, a server receiving a message from the UE, that is, a backend network may forward the message (e.g., VAM, CAM, etc.) received by the server to another server over an interface (e.g., BI), which is determined by filtering of ITS station types, thereby significantly reducing the amount of data transmission. For example, the backend network may selectively protect only motorcyclists corresponding to VRU profile 3 by filtering the ITS station types. Alternatively, the backend network may reduce the amount of data used for the BI by filtering vehicle roles in a CAM. Details thereof will be described below.

Reduction of the Amount of Data Transfer Between Servers Through CAM Filtering

Figure 13:
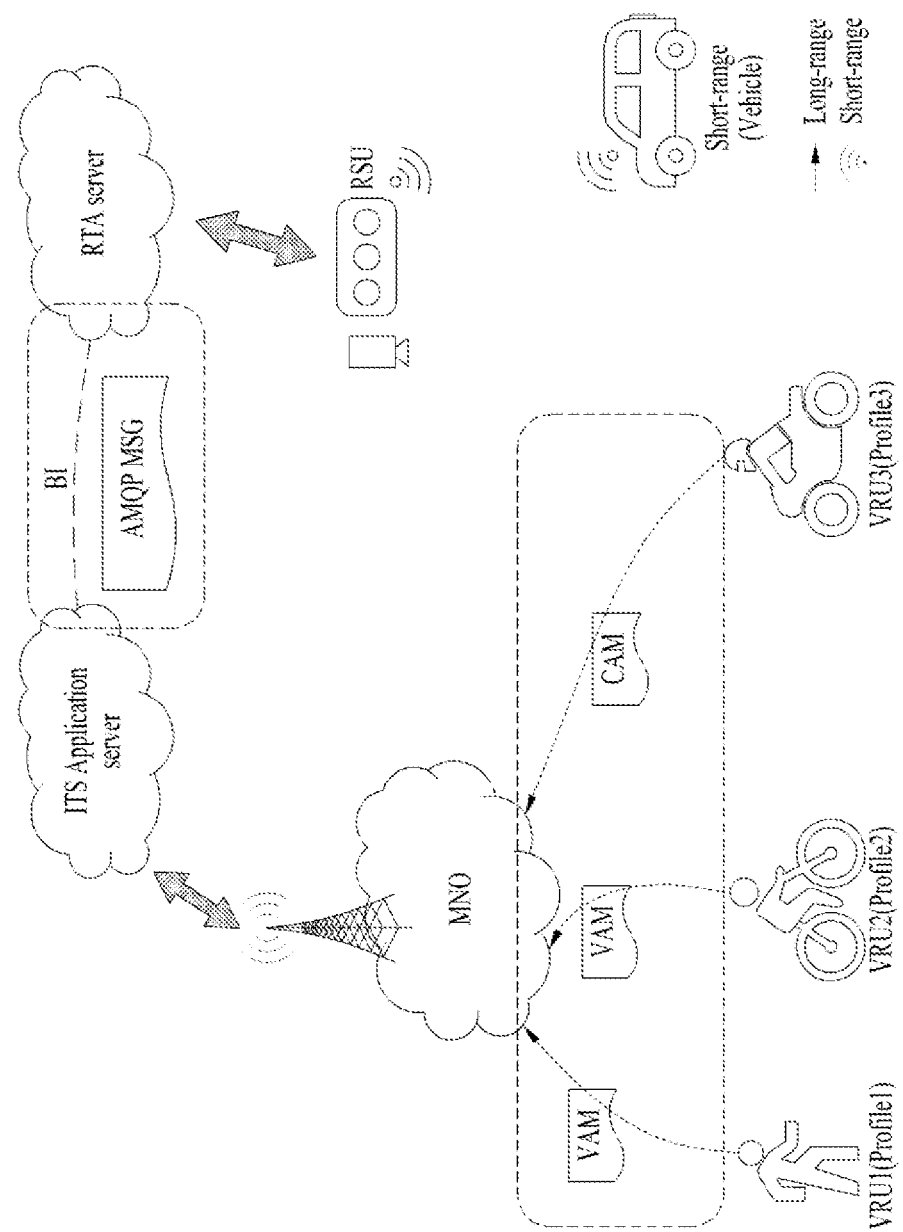
FIGS. 13 and 14 are diagrams for explaining methods of efficiently transmitting and receiving UE messages between servers.
Figure 14:
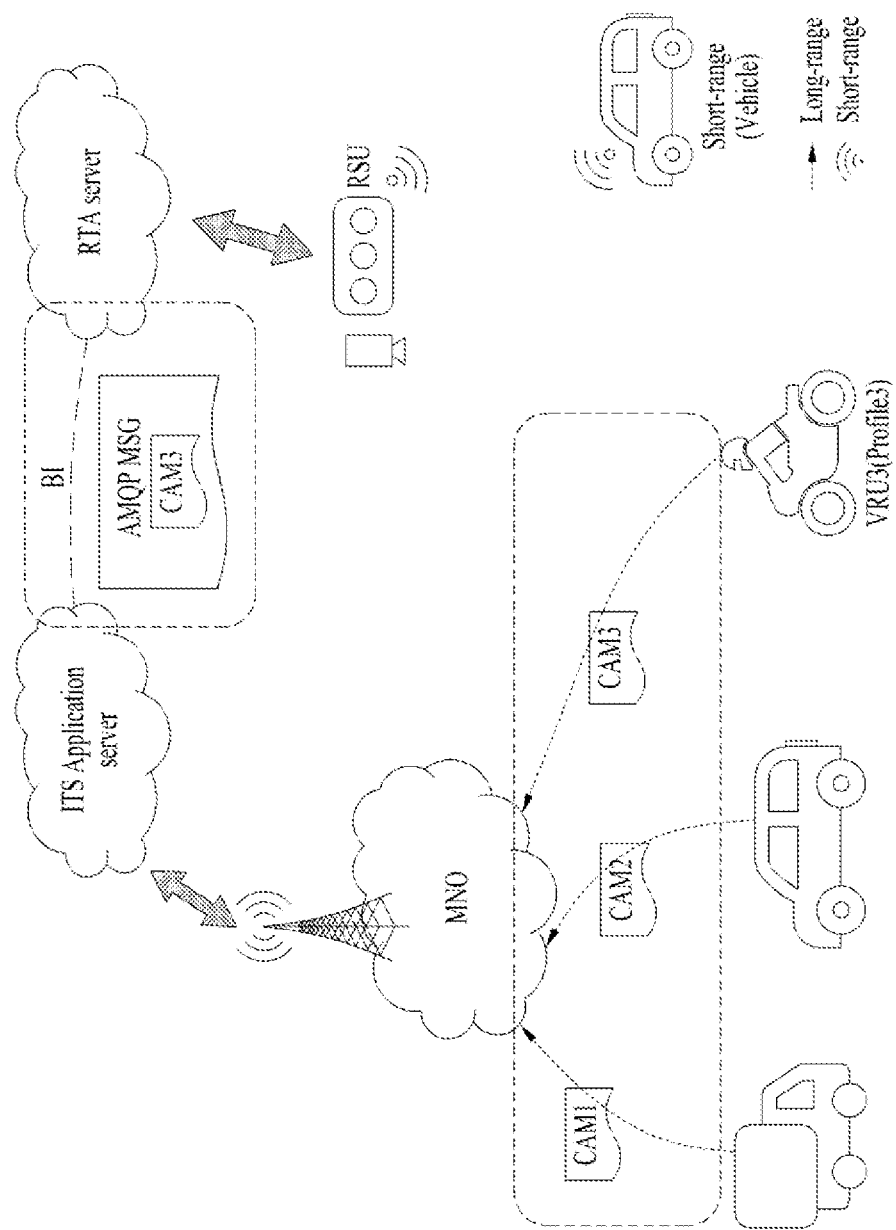

FIGS. 13 and 14 are diagrams for explaining methods of efficiently transmitting and receiving UE messages between servers.

TABLE 5

| Name | Value and type | Description |
| --- | --- | --- |
| publishId | String<br>A two-letter country code and a numerical identifier<br>e.g. "AT00001", "DE15608" | Unique ID of the publisher<br>It is Linked to the country where the provider wants to register. It could be in one country or several. |
| originatingCountry | Country code | where the C-ITS message is created |
| protocolVersion | String<br>e.g.<br>"DENM: 1.2.2",<br>"IVIM: 1.2.1" | Represent the version of standard used to create the message, |
| serviceType | String | Acronym defined in C-Roads_Common C-ITS Service Definitions |
| messageType | String<br>DENM, IVIM, SPATEM, MAPEM, SREM, SSEM, CAM | For this version of the specification the string shall be one of the following: DENM, IVIM, SPATEM, MAPEM, SREM, SSEM, and CAM. The list may be subject to changes in future versions of the specification |
| longitude | Float | Longitude of the event published;<br>DENM(eventPosition), IVI(referencePosition) |
| latitude | Float | Latitude of the event published;<br>DENM(eventPosition), IVI(referencePosition) |
| quadTree | String | Relevant spatial index location of the C-ITS message |

The Application Properties field of the AMQP message may include causeCode and subCauseCode values contained in a conventional DENM as mandatory for filtering the DENM. In addition, the Application Properties field of the AMQP message may optionally include iviType, pictogramCategramCode, and iviContainer values for filtering an infrastructure to vehicle information message (IVIM).

The filtering mechanism used in the BI protocol to exchange the C-ITS message between C-ITS actors may be Referring to FIG. 13, a UE (e.g., VRU or VRU device) may transmit a V2X message to an ITS application server over a Uu-interface, and the ITS application server may forward all received V2X messages (CAM and/or VAM) to a road traffic authority (RTA) server.

Specifically, a VRU (i.e., motorcyclist) belonging to VRU profile 3 may transmit a CAM instead of a VAM when detecting a risk of collision. The CAM may be created by an ITS application installed in the VRU or VRU device owned by the motorcyclist and transmitted to the ITS application server through the Uu-interface.

The ITS application may provide all overall ITS services or only special ITS or C-ITS services depending on the implementation. For example, a specific ITS application may be created for the purpose of VRU protection and installed in the VRU or VRU device. In this case, upon receiving the CAM transmitted by the motorcyclist, the ITS application server may transmit an AMQP message where the CAM is embedded to the RTA server (or, RSU server) over the BI The ITS application server may receive all messages transmitted from all devices on which the ITS application is installed. As shown in FIG. 13, VRU devices may transmit VAMs or CAMs over the Uu-interface depending on profiles, and the servers may exchange the VAMs or CAMs with each other and finally provide services for protecting the VRU devices from vehicles. For example, when a vehicle or motorcycle transmits a CAM to the ITS application server providing VRU services over the Uu-interface, the vehicle or motorcycle may be provided with a VRU protection service through message exchange between the ITS application server and RTA server.

When the ITS application server forwards all received messages to the RTA server, data usage over the BI may increase significantly, and the increase in the data usage may greatly reduce the efficiency of the backend infrastructure. To solve this problem, the ITS application server may filter messages (CAMs or VAMs), which are to be transmitted by the ITS application server to the RTA server, based on stationType information in the CAM. In this case, the number of messages used by the backend infrastructure may be greatly reduced, and a decrease in the amount of data transfer over the BI may increase the efficiency of the backend infrastructure.

Referring to FIG. 14, UEs (e.g., VRUs or VRU devices) may transmit V2X messages to the server through the Uu-interface, and the ITS application server may forward only some of the received V2X messages (CAMs and/or VAMs) to the RTA server based on a filtering mechanism.

Here, the CAM may include BasicContainer, HighFrequencyContainer, LowFrequencyContainer, and/or Special VehicleContainer. BasicContainer may carry basic information on an ITS station (ITS-S) transmitting the CAM and include a data element (DE) stationType. The DE stationType may be defined as integer as follows.

stationType::=INTEGER {unknown(0), pedestrian(1), cyclist(2), moped(3), motorcycle(4), passengerCar(5), bus(6), lightTruck(7), heavyTruck(8), trailer(9), specialVehicles(10), tram(11), roadSideUnit(15)} (0 . . . 255)

The ITS application server may forward only a CAM related to the motorcyclist (or stationType=4) belonging to VRU profile 3 among received CAMs to the RTA server based on stationType of the CAM. In other words, the ITS application server may selectively forward only CAMs where stationType has a predefined specific value among the received CAMs to the RTA server.

For example, as shown in FIG. 14, the ITS application server may forward only a CAM (CAM3) received from the motorcyclist (or a CAM whose stationType is 4) among the three CAMs to the RTA server. In this case, the amount of data transfer may be reduced to ⅓, compared to when all three messages are transmitted.

Alternatively, the ITS application server may perform filtering with respect to VehicleRole included in LowFrequencyContainer in the CAM in order to reduce the amount of data exchanged between backend entities. In this case, VehicleRole may be defined to have 12 types of role as follows.

VehicleRole::=ENUMERATED {default(0), publicTransport(1), specialTransport(2), dangerousGoods(3), roadWork(4), rescue(5), emergency(6), safetyCar(7), agriculture(8), commercial(9), military(10), roadOperator(11), taxi(12), reservedl(13), reserved2(14), reserved3(15)}

In this case, the ITS application server may determine a CAM to be forwarded to the RTA server among CAMs received through the Uu-interface based on VehicleRole of ITS-Ss that transmit the CAMs. That is, the ITS application server may perform filtering based on Special VehicleContainer (the role of the ITS-S) included in the received CAM. When VehicleRole has a value between 1 and 7, the CAM may include specific information about the corresponding ITS-S.

Specifically, Special VehicleContainer may include subcontainers each corresponding to a role as follows.

PublicTransportContainer: embarkationStatus(M), ptActivation(O)
    SpecialTransportContainer: specialTransportType(M), lightBarSirenInUse(M)
    DangerousGoodsContainer: dangerousGoodsBasic(M)
    RoadWorksContainerBasic: roadworksSubCauseCode(O), lightBarSirenInUse(M), closedLanes(O)
    RescueContainer: lightBarSirenInUse(M),
    EmergencyContainer: lightBarSirenInUse(M), incidentIndication(O), emergencyPriority(O), SafetyCarContainer: lightBarSirenInUse(M), incidentIndication(O), trafficRule(O), speedLimit(O)

The above-described fields may be defined as shown in Table 6 below.

TABLE 6

| Element name | Type | Description | |
|---|---|---|---|
| vehicleRole | INT | Integer between 1 and 7 | M |
| embarkationStatus | boolean | EmbarkationStatus is used when the vehicle role is 1. EmbarkationStatus is a value that indicates whether people are currently riding in the vehicle or whether there are loads on the vehicle. If TRUE, it means the ongoing state, and if FALSE, it means that there is no ongoing state. | O |
| specialTransportType | INT | SpecialTransportType is transmitted in the form of a bit string. When vehicleRole in the CAM received by the V2X server is 2, this value changes to one of the following values and then transmitted to the RTA server. heavyLoad(0), excessWidth(1), excessLength(2), excessHeight(3). | O |

TABLE 6-continued

| Element name | Type | Description | |
|---|---|---|---|
| lightBarSirenInUse | INT | If vehicleRole is 2, 4, 5, 6, or 7, lightBarSirenInUse is included in a special vehicle container, which means the state of any sort of audible alarm system including a light bar and horn.<br>The corresponding value transmitted in the form of a bit string may be changed to one of the integers defined below and included in the server message.<br>lightBarActivated (0), sirenActivated (1) | O |
| dangerousGoodsBasic | | If vehicleRole is 3, vehicleRole may be contained in a special vehicle container, which may represent 19 types of hazardous substances defined in the CAM and be expressed as an integer. | O |

Figure 15:
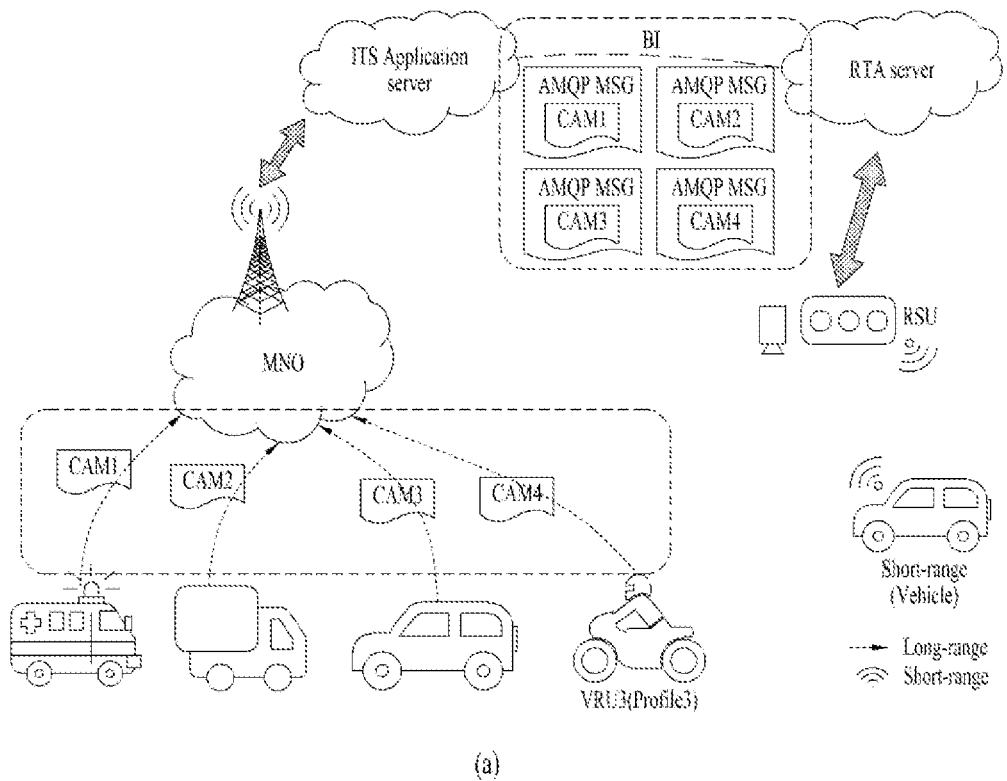
FIG. 15 is a diagram for explaining a method in which an ITS application server forwards messages received through a Uu interface to an RTA server.
Figure 15:
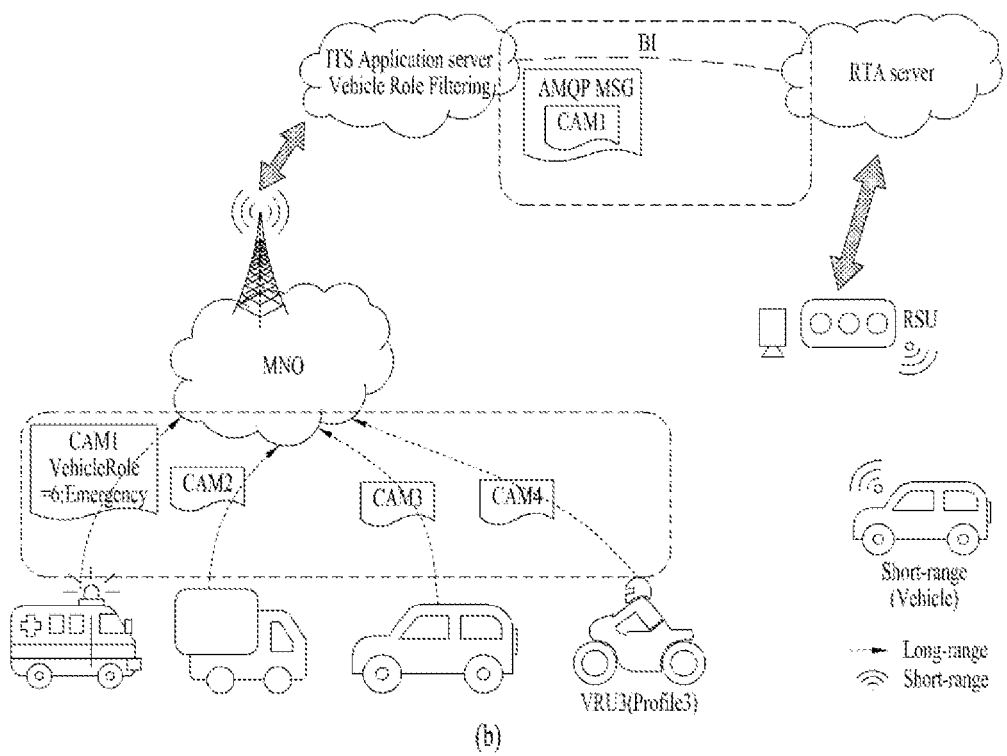

FIG. 15 is a diagram for explaining a method in which the ITS application server forwards messages received through the Uu interface to the RTA server.

Referring to FIG. 15(a), ITS-Ss may transmit a plurality of CAMs, and each of the CAMs may include information on each ITS-S. The ITS application server may convert the received CAM into a message format for in the interface between servers. The ITS application server may transmit a message, which is configured based on the message format, to other servers.

Referring to FIG. 15(b), the ITS application server may receive a filtering request that requests transmission of only messages satisfying specific conditions from the RTA server. In this case, the ITS application server may select and transmit only messages that satisfy the filtering conditions, instead of forwarding all CAMs transmitted from the ITS-Ss to the RTA server. For example, as shown in FIG. 15(b), the RTA server may request to transmit only messages whose CAM vehicle roles are emergency and have a value of 6. The ITS application server may transmit only CAM1 to the RTA server through the BI in response to the request.

In other words, if there is a request (filtering request) from the RTA server, the ITS application server may determine whether to forward a received CAM to the RTA server depending on VehicleRole and/or stationType of the received CAM. That is, the ITS application server may forward only CAMs having VehicleRole and/or stationType corresponding to specific preconfigured values to the RTA server. Specifically, the ITS application server transmits only a CAM in which VehicleRole (included in LowFrequency-Container) has a specific value or a CAM in which station-Type (or VRU profile) has a specific value to the RTA server according to the request (filtering request) from the RTA server. The filtering request may be triggered based on the amount of data exchanged between the RTA server and ITS application server. For example, if the amount of data exchanged between the RTA server and ITS application server is greater than or equal to a predetermined threshold, the RTA server may request the ITS application server to transmit only CAMs having specific values to the RTA server.

Alternatively, the ITS application server may obtain information on the congestion level (channel busy ratio (CBR) or channel occupancy ration (CR)) of a road. If the obtained congestion level is greater than or equal to a preconfigured congestion level, the ITS application server may determine whether to transmit the received CAM to the RTA server, depending on VehicleRole and/or stationType of the CAM.

Figure 16:
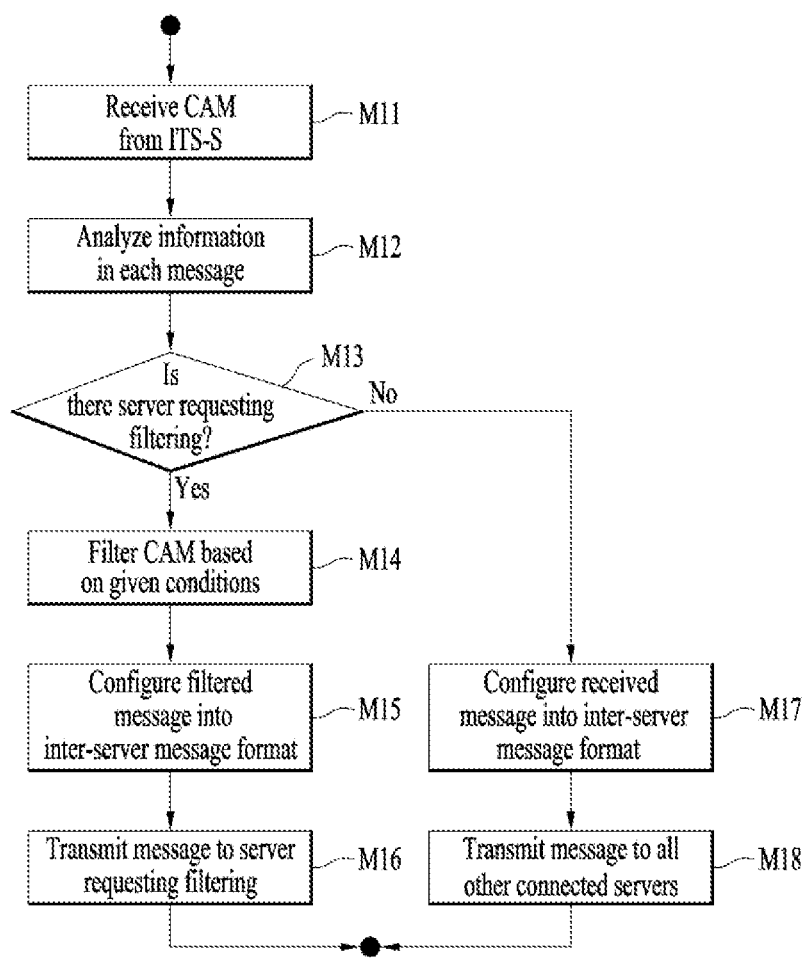
FIG. 16 is a flowchart illustrating a method in which an ITS application server efficiently forwards messages received from a plurality of ITS-Ss to an RTA server.

FIG. 16 is a flowchart illustrating a method in which the ITS application server efficiently forwards messages received from a plurality of ITS-Ss to the RTA server.

Referring to FIG. 16, the ITS application server may receive CAMs (VAMs or V2X messages) from a plurality of ITS-Ss or a plurality of VRU devices (M11). The ITS application server may analyze the CAMs based on fields included in each of the received CAMs (M12). The ITS application server may determine how to configure a message to be forwarded to the RTA server depending on whether a request for filtering is received from the RTA server (M13). When receiving the request, the ITS application server may select at least one CAM satisfying filtering conditions among the CAMs based on the filtering conditions (M14). The ITS application server may configure and generate a message that includes the at least one filtered CAM and has an inter-server message format (M15). The ITS application server may transmit the configured message to the RTA server.

Alternatively, when there is no request for filtering, the ITS application server may configure a message among the received CAMs based on the inter-server message format (M16). The ITS application server may transmit the configured message to the RTA server or other connected servers (M17).

Hereinafter, a method in which the ITS application server reconfigures a message with a message format corresponding to an interface between servers based on clustering of a plurality of received CAMs (V2X messages, VAMs, and VRU messages) will be described. The message reconfiguration based on the clustering may greatly reduce the amount of data exchanged between servers and minimize a delay in message exchange caused by an increase in the amount of data.

Reconfiguration of Messages Based on Clustering

VRU devices may transmit VAMs to the ITS application server through the Uu-interface as messages for VRU protection. The ITS application server may perform a clustering operation of analyzing and recombining received messages for VRU protection (e.g., VAMs, CAMs, DENMs, V2X messages, etc.) based on information on the reference positions and dynamics of VRUs included in the messages for VRU protection (or VRU message). In addition to the clustering operation, the above-described filtering operation may also be performed. That is, while messages are exchanged between servers, the clustering operation described below may be performed together with the filtering operation based on VehicleRole and/or stationType included in the VRU message or CAM.

Specifically, VRU devices may generate and transmit VRU messages to the ITS application server through the Uu-interface. The ITS application server may obtain information on the reference position of each VRU and information on the dynamics such as the movement direction and speed of each VRU by analyzing each of the received VRU message. From the collected VRU messages, the ITS application server may determine whether the VRU devices are currently dense. The ITS application server may determine whether there are areas where the VRU devices will be concentrated at some point in the future based on the dynamics.

The ITS application server may perform the clustering operation depending on the following conditions, which are related to cluster creating/joining operations, through short-range communication.

i) When the ITS application server receives 3 to 5 (numCreateCluster) VRU messages, each of which contains information on the position of a VRU within a distance of 3 to 5 m (maxClusterDistance) from the reference position of the VRU, the ITS application server may configure the bounding box area of a VRU cluster by combining the reference position information in the received VRU messages and calculate the number of cluster members included in the bounding box. In this case, the ITS application server may transmit one inter-server exchange message (e.g., AMQP message) including the configured and calculated information (or cluster information) to other servers. Alternatively, the ITS application server may cluster received messages based on information on the reference position and dynamics (moving direction, speed, etc.) included in each of the received messages such as VAMs and then reconfigure an inter-server exchange message (e.g., AMQP message) based on the clustered cluster information. For example, the ITS application server may reconfigure one AMQP message corresponding to one cluster and transmit the reconfigured one AMQP message to other servers.

ii) When the number of members included in a cluster is less than 20 (maxClusterSize), if a VRU identified in a newly received message is within the bounding box of the cluster, or if the VRU is located within 3 to 5 m (maxClusterDistance) from the bounding box and the speed difference with the VRU cluster determined by the server is less than or equal to 5% (maxClusterVelocityDifference), the ITS application server may update information on the corresponding cluster and then transmit the updated cluster information to other servers in an inter-server exchange message. Alternatively, when the reference position included in a message received from a new device is included in or adjacent to the bounding box area of a specific cluster, and when the difference between the dynamics in the received message and the dynamics of the cluster is less than or equal to a predetermined value, the ITS application server may update information on the specific cluster to further include the information in the message and then transmit the updated cluster information to other servers.

iii) When the bounding box area of a cluster changes due to a newly added cluster member or when the dynamics (speed, heading, etc.) of the cluster change, the ITS application server may update cluster information. The ITS application server may transmit the updated cluster information to another server in an inter-server exchange message, and the other server may update current cluster information based on the updated cluster information.

iv) When it is determined by a message received from a VRU located within the bounding box of a cluster that the position of the VRU is more than 3 to 5 m (maxClusterDistance) away or the speed difference with the VRU cluster is more than 5% (maxClusterVelocityDifference), the ITS application server may exclude the VRU from the cluster. In this case, the ITS application server may update cluster information and transmit the updated cluster information to other servers. In other words, if there is a message including a reference position outside the bounding box area related to a specific cluster or a message including dynamics having a predetermined difference from the dynamics related to the specific cluster among a plurality of messages related to the specific cluster, the ITS application server may update specific cluster information by excluding information in the message from the specific cluster information.

Hereinafter, a method in which the ITS application server clusters received VRU messages according to the above-described cluster conditions and then adds cluster information to an inter-server exchange message to be transmitted to another server connected through the BI will be described.

When the ITS application server creates and manages a VRU cluster based on messages from VRUs, the ITS application server may include information on zero or more clusters in an inter-server message. If the conditions for cluster generation are not met, the ITS application server may sequentially transmit the received messages to other servers.

Alternatively, when the ITS application server clusters one or more clusters, the ITS application server may include the number of the one or more clusters and cluster information on each of the one or more clusters in an inter-server exchange message as shown in Table 7 below.

TABLE 7

| NumOfCluster | INT | Value between 0 and 255 | M |
|---|---|---|---|
| ClusterInfo | ClusterInfoType | This is cluster information that includes cluster values defined in Table 8 below, and information on clusters as many as NumofCluster may be transmitted. If NumofCluster is 0, no clusters are included. | O |

Information on each VRU cluster managed by the ITS application server may include the following values defined in Table 8.

TABLE 8

| ClusterID | INT | Value between 0 and 255 | M |
|---|---|---|---|
| referencePosition | | This indicates the reference position (latitude, longitude, altitude, etc.) of a cluster, the position of a cluster leader, or the center of the cluster. | M |
| velocity | INT | This indicates the average speed of VRU devices included in a cluster or the speed of a cluster leader. | M |
| boundingBoxShape | INT | This indicates one of rectangle (1), circle (2), and polygon (3). | M |
| areaRectangle | TBD | This indicates the center point, width, and height of a rectangular area. | O |
| areaCircular | TBD | This indicates the radius and center point of a circular area. | O |
| areaPolygon | TBD | This indicates a set of coordinates for each vertex representing a polygon area. | O |
| numberOfVRU | INT | This indicates a value between 0 and the maximum. | O |
| clusterDensity | % | This indicates to a ratio of the number of VRUs included in a reference area (e.g., 1 $m^2$) within an area measured by the server as one cluster. | O |
| expectedBreak-upTime | INT | This indicates information on the break-up time of a cluster expected by the server. | O |

TABLE 8-continued

| ClusterID | INT | Value between 0 and 255 | M |
|---|---|---|---|
| riskLevel | INT | This indicates the level of a risk measured by the server for a corresponding cluster. | O |
| specialArea | INT | If a cluster managed by the server exists within a special area, this indicates one of the following:<br>1. Before crossing crosswalk<br>2. Crosswalk (on roadway)<br>3. Bus stop<br>4. Construction site<br>5. Children protection zone<br>6. Senior protection zone<br>7. Parking lot<br>8. Bike Path | O |

Alternatively, the ITS application server may obtain information requested by each server through a negotiation with other servers based on the exchange message. In this case, the information requested by each server may include information on the generation of the cluster.

The ITS application server managing VRU cluster(s) may generate an inter-server exchange message based on VRU messages received from VRU devices and then transmit the exchange message to another server connected to the backend network. In the backend network where a plurality of servers are connected, each server may have different purposes and functions and also require different information. Accordingly, the inter-server exchange message reconfigured based on VRU messages received by the ITS application server may not include information that a specific server (e.g., RTA server) requires.

Specifically, when there are two servers connected to the backend network: servers A and B, server A may generate and manage a cluster by analyzing VRU messages received from VRU devices and transmit an inter-server message including cluster information on the generated cluster to server B. Server B may transmit to server A an inter-server message requesting server A to generate a cluster under cluster conditions desired by server B. In this case, the request from server B may include information defined in Table 9.

TABLE 9

| Request from server B | Description | Expected behavior of server A |
|---|---|---|
| LowerDensity | Lower VRU Density | The density of VRUs included in a cluster decreases by expanding the area of the cluster. |
| HigherDensity | Higher VRU Density | The density of VRUs included in a cluster increases by reducing the area of the cluster. |
| special area | Request information on only clusters distributed in a specific area | Server A performs clustering based on messages received from VRUs, determines whether each cluster is related to a special area, and transmits to server B information on only clusters related to the special area requested by server B. |
| Risk level | Request information on only clusters related to a specific risk level | Server A transmits to server B information on only clusters related to a risk level requested by server B. |

When server A is capable of generating a cluster in response to the request from server B, server A may transmit a response message to the request. After transmitting the response message, server A may newly cluster received VRU messages in response to the request and then transmit an inter-server message including cluster information on the newly clustered cluster to server B. Alternatively, server A may reconfigure a bounding box area according to the request from server B and generate cluster information related to the reconfigured bounding box area. For example, server A may receive from server B a request for increasing or decreasing the bounding box area or a request for (re)configuring the bounding box area such that the bounding box area corresponds to a special area.

On the other hand, when server A is incapable of generating a cluster according to the request from server B, server A may transmit to server B a rejection message related to the impossibility and then stop transmitting an inter-server message related to VRU messages to server B.

Accordingly, server A or the ITS application server may cluster VRU messages received from road users including VRUs and transmit the clustered message to other servers, thereby greatly reducing the amount of data transfer of inter-server exchange messages and greatly reducing the latency as well.

Figure 17:
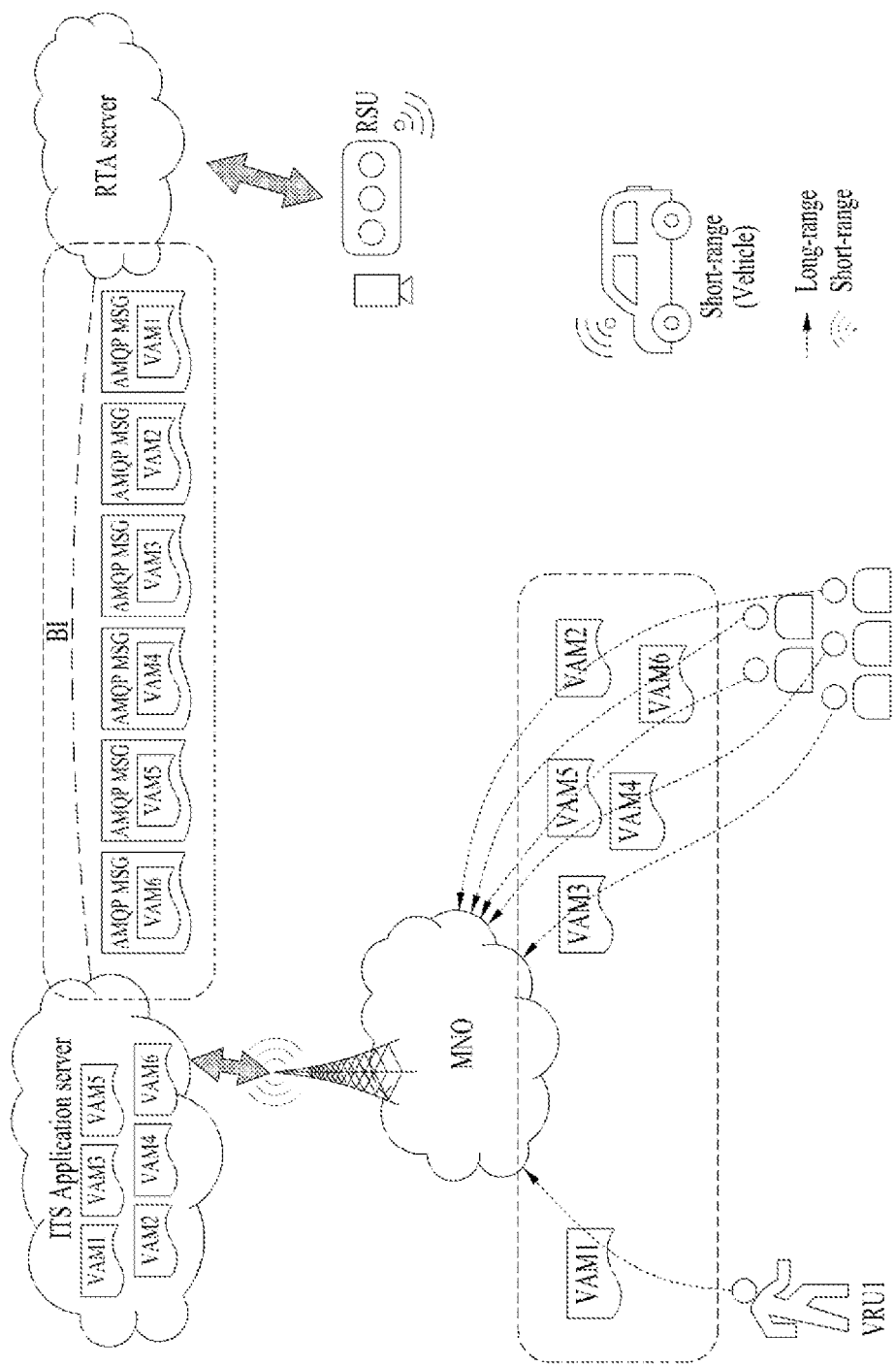
FIGS. 17 and 18 are diagrams for explaining methods in which an ITS application server generates and transmits an inter-server exchange message based on clustering.
Figure 18:
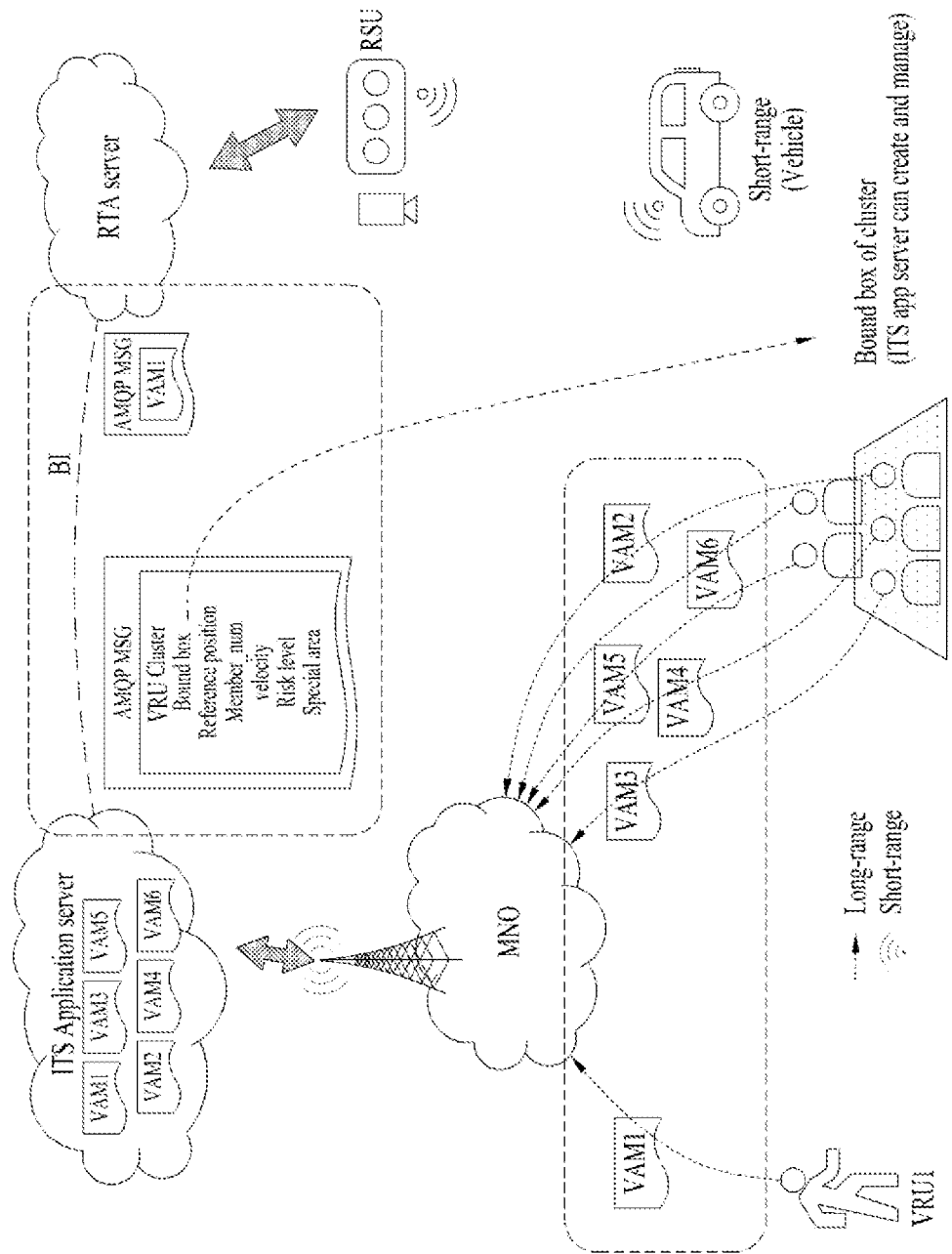

FIGS. 17 and 18 are diagrams for explaining methods in which the ITS application server generates and transmits an inter-server exchange message based on clustering.

For the clustering, at least one of cluster conditions i) to iv) described above may be considered.

Referring to FIG. 17, instead of clustering received VRU messages, the ITS application server may reconfigure each of the received VRU messages into an inter-server exchange message (e.g., AMQP message). Then, the ITS application server may transmit the inter-server exchange message to the RTA server over the BI. For example, even if VRUs are not far from each other, the ITS application server may reconfigure VAM2 to VAM6 (i.e., VRU messages) in a format suitable for the inter-server interface in chronological order of reception and then transmit the messages to the RTA server.

Referring to FIG. 18, the ITS application server may reconfigure received VRU messages into an inter-server exchange message based on clustering and then transmit the reconfigured inter-server exchange message to the RTA server. For example, the ITS application server may configure a bound box, which is called a cluster area, based on dynamic information and position information in VRU messages (VAM2 to VAM6). In addition, the ITS application server may reconfigure one VRU message by clustering the VRU messages (VAM2 to VAM6) related to the bound box. As shown in FIG. 18, the ITS application server may further include cluster information related to the clustering in the one VRU message and transmit the cluster information to the RTA server. In this case, VAM2 to VAM6 may be reconfigured into one inter-server message by the clustering, and thus, the amount of information exchanged via the inter-server interface may be greatly reduced.

Figure 19:
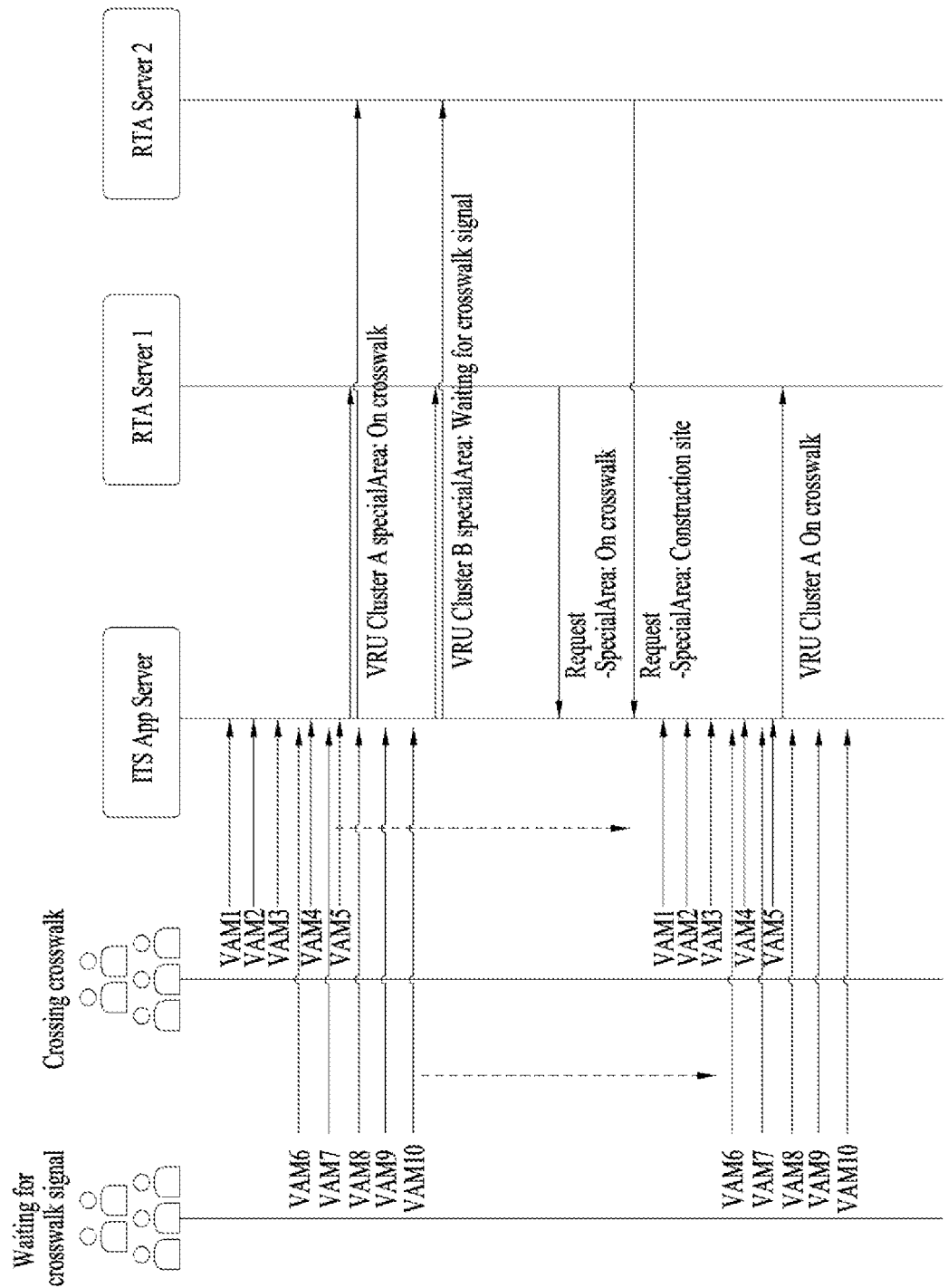
FIG. 19 is a diagram for explaining a method of reconfiguring an inter-server message through a negotiation procedure between servers.

FIG. 19 is a diagram for explaining a method of reconfiguring an inter-server message through a negotiation procedure between servers.

For the clustering, at least one of cluster conditions i) to iv) described above may be considered.

Referring to FIG. 19, the ITS application server may receive VRU messages (VAM1 to VAM10) from a plurality of VRU devices. The ITS application server may obtain dynamic information and position information from the VRU messages and cluster the VRU messages based on the information.

For example, the ITS application server may configure a bound box or cluster area (VRU cluster area A) related to a crosswalk for VAM1 to VAM5 that satisfy the above-described clustering conditions. The ITS application server may transmit an inter-server message obtained by reconfiguring VAM1 to VAM5 located in VRU cluster area A to each of RTA server 1 and RTA server 2. In this case, the reconfigured inter-server message may include first cluster information on VRU cluster area A. In addition, the ITS application server may configure a bounding box or cluster area (VRU cluster area B) related to crosswalk traffic lights for VAM6 to VAM10 that satisfy the above-described clustering conditions. The ITS application server may transmit an inter-server message obtained by reconfiguring VAM6 to VAM10 located in VRU cluster area B to each of RTA server 1 and RTA server 2.

Next, the ITS application server may receive a request messages related to clustering from each of RTA server 1 and RTA server 2. The ITS application server may negotiate with each of RTA server 1 and RTA server 2 through the request message. RTA server 1 may request to receive only information on cluster(s) crossing the crosswalk in the request message, and RTA server 2 may request to receive only information on cluster(s) existing in a construction site in the request message. In this case, the ITS application server may update current cluster information (VRU cluster area A and VRU cluster area B) based on the request message.

On the other hand, since the ITS application server has no clusters related to the item (clustering request for the construction site) requested by RTA server 2, the ITS application server may stop transmitting the inter-server message for the VRU messages to RTA server 2. That is, when it is determined based on the request message that RTA 2 server does not require the VRU messages received by the ITS application server, the ITS application server may stop transmitting the inter-server message for the received VRU messages, thereby reducing the amount of data transmitted over the inter-server interface.

Figure 20:
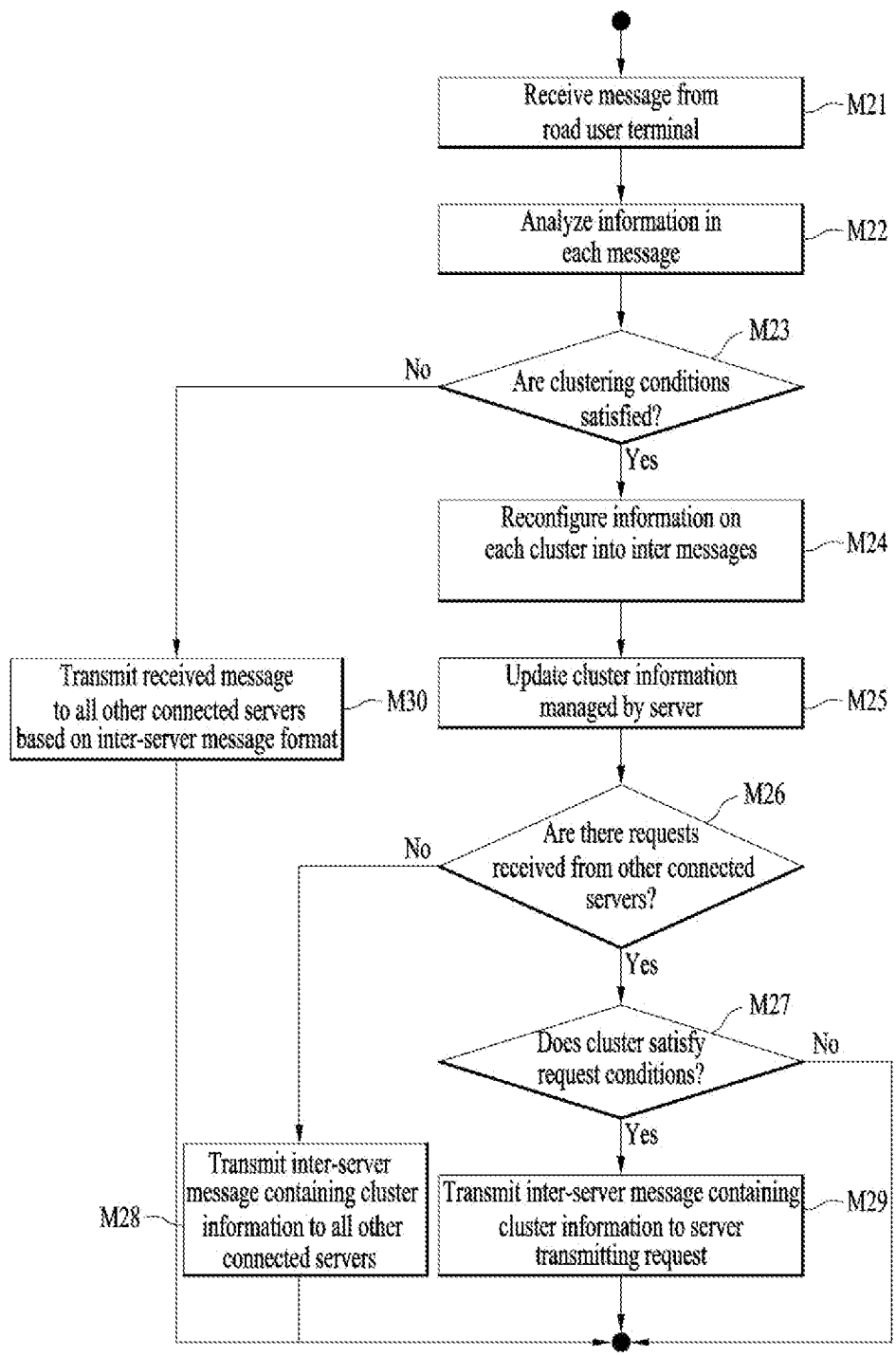
FIG. 20 is a flowchart illustrating a method in which an ITS application server reconfigures and transmits a plurality of VRU messages to other servers.

FIG. 20 is a flowchart illustrating a method in which the ITS application server reconfigures and transmits a plurality of VRU messages to other servers.

Referring to FIG. 20, the ITS application server may receive a plurality of VRU messages from road users and/or VRU devices (M21). The ITS application server may analyze the plurality of VRU messages to obtain information on the position and/or dynamics of each VRU based on the plurality of VRU messages (M22). The ITS application server may determine whether there are VRU messages satisfying the cluster conditions based on the analysis results of the plurality of VRU messages (M23).

When there are VRU messages satisfying the cluster conditions, the ITS application server may generate cluster information for the VRU messages and generate one inter-server message including the generated cluster information by reconfiguring the VRU messages (M24). On the other hand, if current cluster information is related to the generated cluster information, the ITS application server may update the current cluster information based on the generated cluster information (M25). The ITS application server may determine whether a request message related to the cluster is received from at least one server connected through the BI (M26). If a request message is received from a specific server, the ITS application server may determine whether the generated or updated cluster information satisfies a cluster condition requested by the request message (M27). When the generated or updated cluster information satisfies the cluster condition requested by the request message, the ITS application server may transmit the generated or updated cluster information to the specific server (M29). Alternatively, when the generated or updated cluster information does not satisfy the cluster condition requested by the request message, the ITS application server may not transmit the generated or updated cluster information to the specific server.

On the other hand, if the request message related to the cluster is not received (or if the request message related to the cluster is not transmitted from the specific server), the ITS application server may transmit the inter-server message including the cluster information formed by the ITS application server to other servers connected to the ITS application server or to the specific server (M28).

When there are no VRU messages satisfying the above-described clustering conditions among the plurality of VRU messages, the ITS application server may transmit an inter-server message separately generated for each of the plurality of VRU messages to each server without clustering (M30).

Hereinafter, operations between a server and VRU device (or UE) will be described in detail based on the above-described clustering Control of Message Transmission at UE Based on Interaction Between Server and UE To reduce the amount of data transfer in the above-described clustering, it may be considered that only one VRU device representing VRU devices included in a specific area transmits a VRU message (e.g., CAM, VAM, V2X message, etc.).

VRU clustering, which supports short-range communication, may be performed based broadcasting of a VRU message including the following operations: creation, join, leave, and break-up between VRU devices. The leader of a cluster may create the cluster. Then, the cluster leader may include and transmit cluster information such as an area (or cluster area) covered by the cluster leader and the number of cluster members in a VRU message. Other VRU devices (hereinafter referred to as cluster members) included in the cluster may stop VRU message transmission.

On the other hand, when long-range communication is used for ITS services to protect VRU devices, a series of operations (i.e., create, join, leave, and break-up), which are required to perform VRU clustering in short-range communication, may be performed by the server rather than message exchange between VRUs. In this case, clustering may be performed more efficiently compared to message exchange between VRU devices.

Specifically, the server (e.g., ITS application server) may receive VRU messages from VRU devices and then collect, analyze, and extract cluster information from the received VRU messages. The server may transmit the cluster information, which is generated by the server based on analyzing/combining, to other servers connected to the server. The server may transmit only extracted information related to clustering to the other servers through the inter-server BI, instead of transmitting all received VRU messages. In this case, since the server does not transmit an inter-server message for each of the received VRU messages, the amount of data transfer used for communication between servers may be greatly reduced.

However, when cluster-related management is performed only between servers, each of a plurality of VRU devices may not know which cluster the VRU device belongs to. As a result, the VRU device may unnecessarily transmit a VRU message periodically as in the prior art. In this case, the number of VRU messages transmitted from the VRU devices may cause problems of communication performance degradation such as excessive signal interference and signal collision in a dense area where a plurality of VRUs are concentrated or in an area with a high risk of collision. In addition, an increase in the number of inter-server messages due to reception of a plurality of VRU messages may cause problems to the communication quality and delay between servers.

Hereinafter, a method of controlling the amount of messages transmitted by a VRU device (or UE) configured to transmit a message (e.g., VRU message, V2X message, etc.) to a server configured to cluster and manage messages received from VRU devices based on interaction between the server and VRU device (or UE) will be described in detail in consideration of the above problems. That is, while messages are exchanged between servers, the clustering operation described below may be performed together with the filtering operation based on VehicleRole and/or stationType included in the VRU message or CAM.

The server may transmit a plurality of messages received from VRU devices to other servers connected to the server. As described above, when the server converts each of the received messages (e.g., CAM and VAM transmitted periodically and/or DENM and IVIM transmitted based on events) into an inter-server message (e.g., AMQP message) related to the BI and then transmit the inter-server message to each of the other servers, the amount of data transfer between servers may considerably increase. Accordingly, the server may generate cluster information related to the plurality of messages based on clustering and exchange the cluster information with the other servers, thereby greatly reducing the amount of data exchanged between servers.

In this case, since the VRU devices are incapable of determining whether the VRU devices are included in a cluster determined by the server, all VRU devices may periodically transmit messages based on predetermined triggering conditions. In this case, to avoid communication performance degradation in a dense area or an area with a high risk of collision, the VRU devices may share the cluster information with the server and determine whether to transmit their own messages based on the shared cluster information. Alternatively, when it is determined that the VRU device is out of the corresponding cluster area based on the shared cluster information, the VRU device may continue to transmit or resume the transmission of its own message.

Specifically, sharing of cluster information between the server and VRU device may be performed as follows.

The server may receive a plurality of messages transmitted from VRU devices and analyze the plurality of received messages. When the server determines that the server is capable of clustering and managing the plurality of messages received from the VRU devices (that is, when it is determined based on dynamics information and/or position information in the plurality of messages that there are messages that satisfy the cluster conditions), the server may cluster the plurality of messages and configure cluster information related to each cluster. The server may transmit an inter-server exchange message (e.g., AMQP message) including the cluster information related to the cluster to other servers over the BI.

In addition, the server may perform an interaction operation with the VRU devices. The server may transmit the cluster information on the generated or clustered cluster to VRU devices included in the cluster generated by the server.

In addition, the interaction information that the server transmits to the VRU devices (e.g., VRUs) may include the following items.

a. Cluster related information: cluster speed, movement direction, current cluster area (or cluster area), and the number of cluster members b. Next cluster area expected by server: representative geographic points (or expected cluster position) of a next cluster area as information on the next cluster area expected by the server based on the speed and movement direction of the cluster c. Expected time until movement to next cluster area Herein, a message containing interaction information consisting of information a, b, and/or c described above is defined as an interaction message.

VRU devices may obtain cluster information related to a cluster managed by the server from an interaction message and then determine whether the VRU devices are included in the cluster based on the cluster information. When the VRU device does not belong to the cluster, the VRU device may separately transmit a VRU or V2X message to the server while maintaining the conventional method of transmitting VRU or V2X messages.

Upon receiving the interaction message from the server, the VRU devices may obtain an expected time assumed by the server and a next cluster area after the expected time. Each of the VRU devices may compare information on its movement path and dynamics with information included in the interaction message from the server in order to estimate whether the VRU device will be located in the next cluster area at the expected time. When it is determined or estimated that the VRU device is not in the next cluster area, if the VRU device satisfies conditions of triggering separate VRU messages (e.g., VAM), the VRU device may resume message transmission.

In other words, when it is expected based on the information on its movement path and/or dynamics that the VRU device is not located in the next cluster area, which is included in the message from the server, the VRU device may transmit messages such as its own VAM. In this case, the message may be transmitted after the time at which the VRU device is not expected to be located in the next cluster area or after the expected time indicated by the server.

In addition, the interaction message may include the position of a corresponding cluster leader (i.e., VRU device). Among the VRU devices, a leader VRU device that determines that it is the cluster leader designated by the server may stop transmitting its own message during the time expected by the server. Then, the leader VRU device may transmit a cluster message including cluster information reflecting its own information to the server after the expected time.

The server may receive the cluster message and update cluster information managed by the server. Specifically, the server may obtain dynamic information containing the location and speed measured by the cluster leader VRU device, which is designated by the server, from the cluster message. If the obtained information on the position and dynamics is determined to be reliable, the server may update the cluster information estimated and managed by the server. The server may transmit the updated cluster information to other servers.

Messages exchanged between the server and VRU devices (interaction message, cluster message, etc.) may not have specific formats defined. In this case, the messages may be transmitted and received between the server and VRU devices based on predefined formats.

FIGS. 21 to 25 are diagrams for explaining methods of performing interaction between the server and VRU devices.

Figure 21:
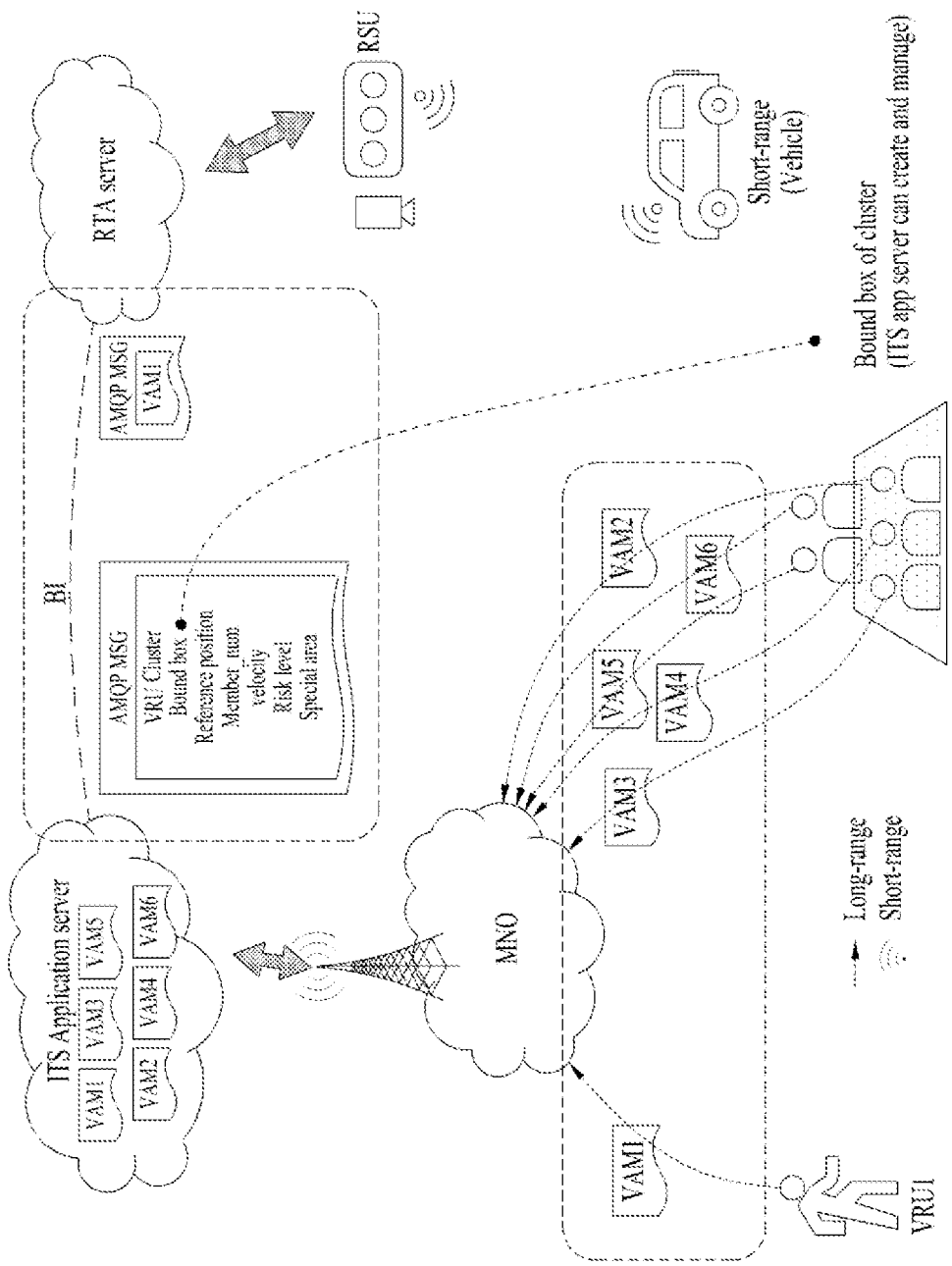
FIGS. 21 to 25 are diagrams for explaining methods of performing interaction between a server and VRU devices.

Referring to FIG. 21, each of VRU1 to VRU6 may transmit its message (VAM1 to VAM6) to the ITS application server. The ITS application server may analyze each of the received messages, i.e., VAM1 to VAM6, cluster VAM2 to VAM6 that satisfy the above-described cluster conditions, and reconfigure VAM2 to VAM6 into one inter-server message. The ITS application server may configure VAM1 that does not satisfy the cluster conditions as a separate inter-server message.

The ITS application server may transmit the two messages (AMQP messages) created by the ITS application server to the RTA server. In this case, the two messages may be a message including cluster information on a cluster (reconfigured for VAM2 to VAM6) and a message for VAM1 that is not included in the cluster.

Figure 22:
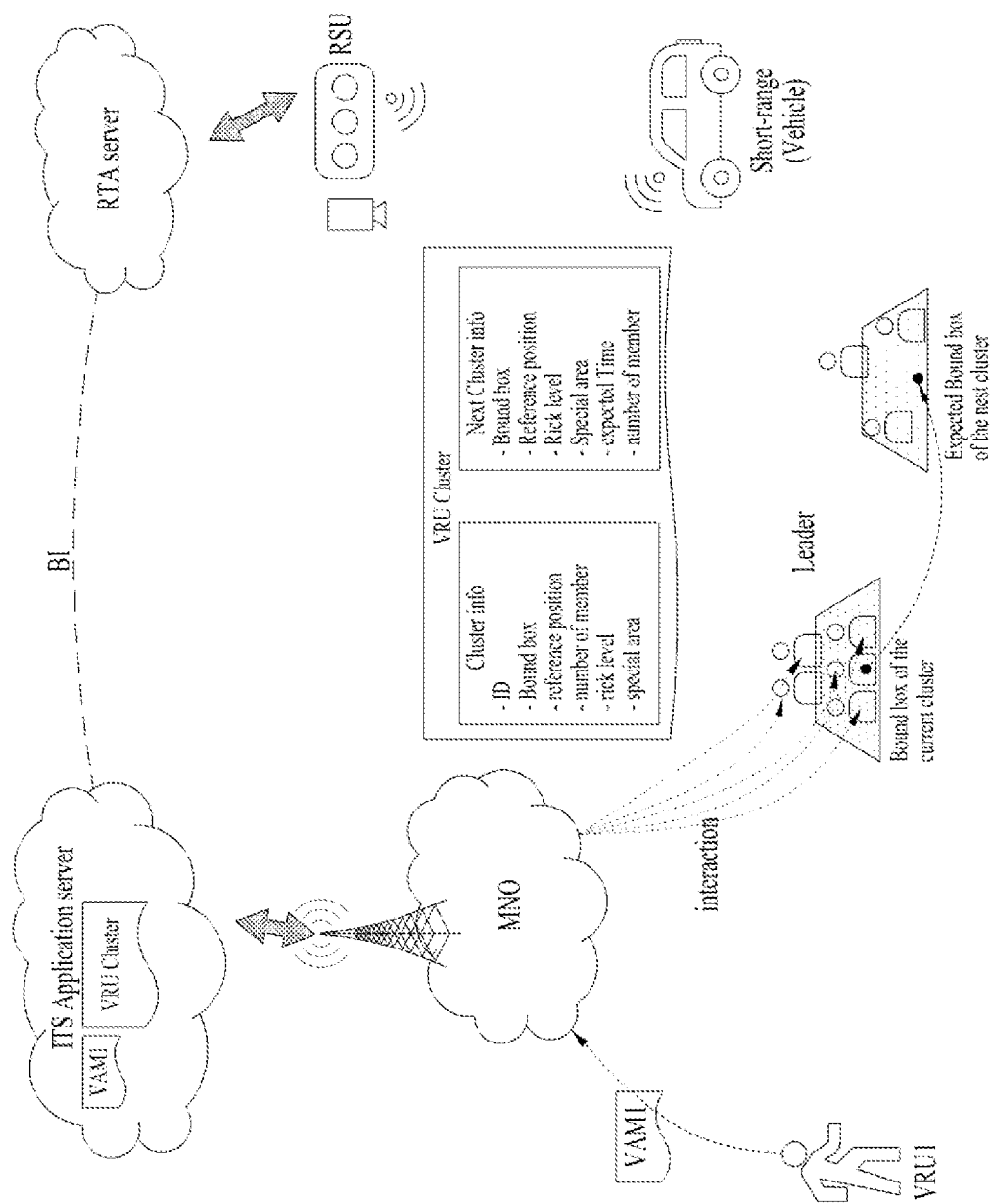

Referring to FIG. 22, the ITS application server may transmit a message (or interaction message) including the cluster information generated by the ITS application server to the VRU devices (or UEs) belonging to the cluster. The cluster information may include information on the position and dynamics of the current cluster, information on an expected time, and information on a next cluster area. That is, as described above, the ITS application server may estimate the next cluster area expected after a certain period of time based on the information on the dynamic (heading, speed, etc.) of the cluster. The ITS application server may transmit the information on the current cluster and the information on the next cluster area to the VRU devices included in the cluster. For example, the ITS application server may transmit an interaction message including the current cluster information and information on a, b, and c described above to the VRU devices included in the corresponding cluster.

Figure 23:
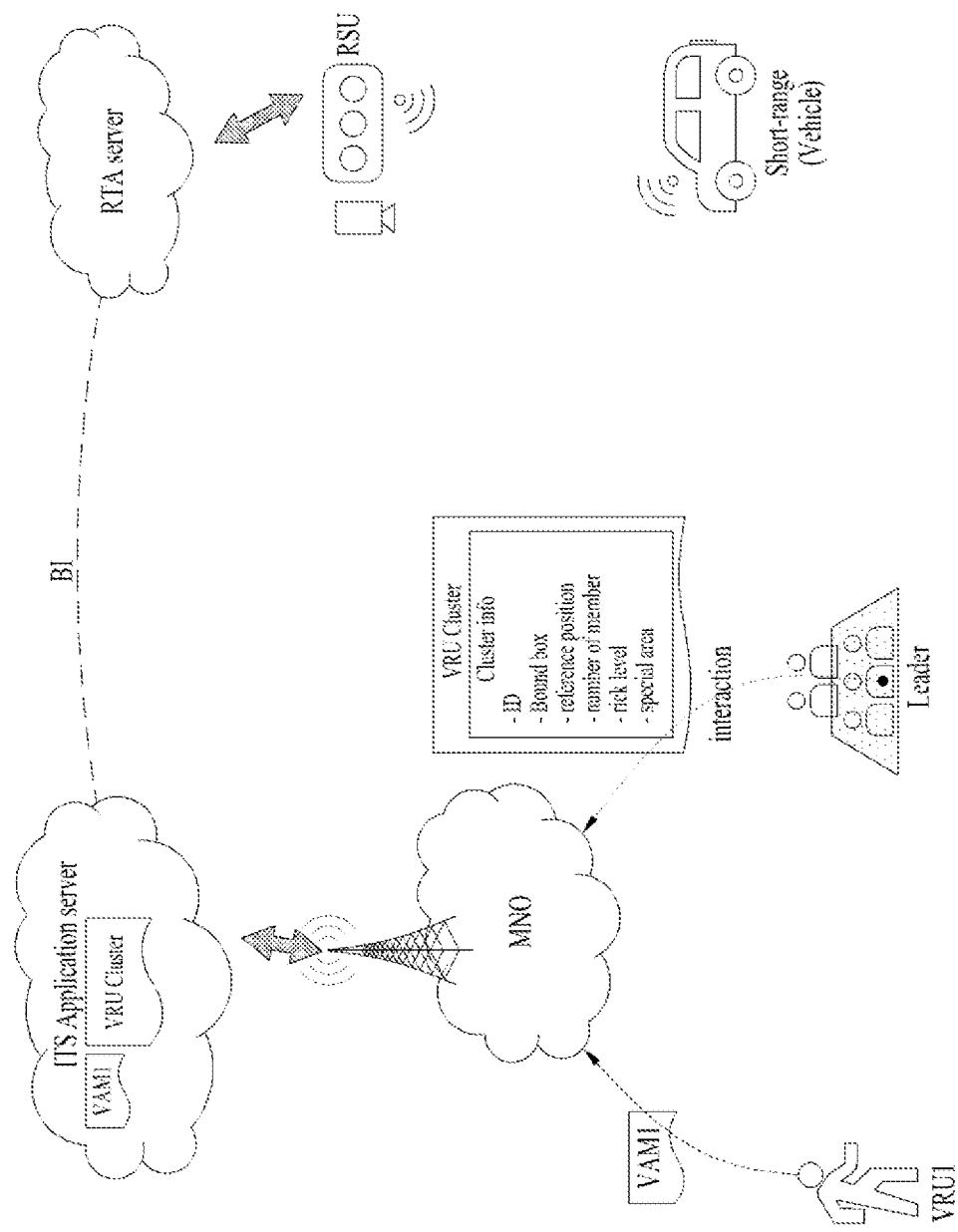

Referring to FIG. 23, each of the VRU devices (or UEs) included in the cluster may stop transmitting messages based on the received interaction message. Specifically, each of the VRU devices included in the cluster may stop transmitting messages until the expected time included in the interaction message.

As described above, among the VRU devices, a leader VRU device that is located at a leader position (or reference position) included in the interaction message may operate as a cluster leader related to the cluster information. The leader may generate VRU cluster information (i.e., changed cluster information) based on information on its position and/or dynamics and then transmit the VRU cluster information to the ITS application server.

Alternatively, the ITS application server may further include information on the reference position in the cluster information and transmit the cluster information to the VRU devices. In this case, only at least one VRU located at the reference position (or within a predetermined error range from the reference position) among the VRU devices may represent the cluster and transmit the VRU cluster information to the ITS application server.

Figure 24:
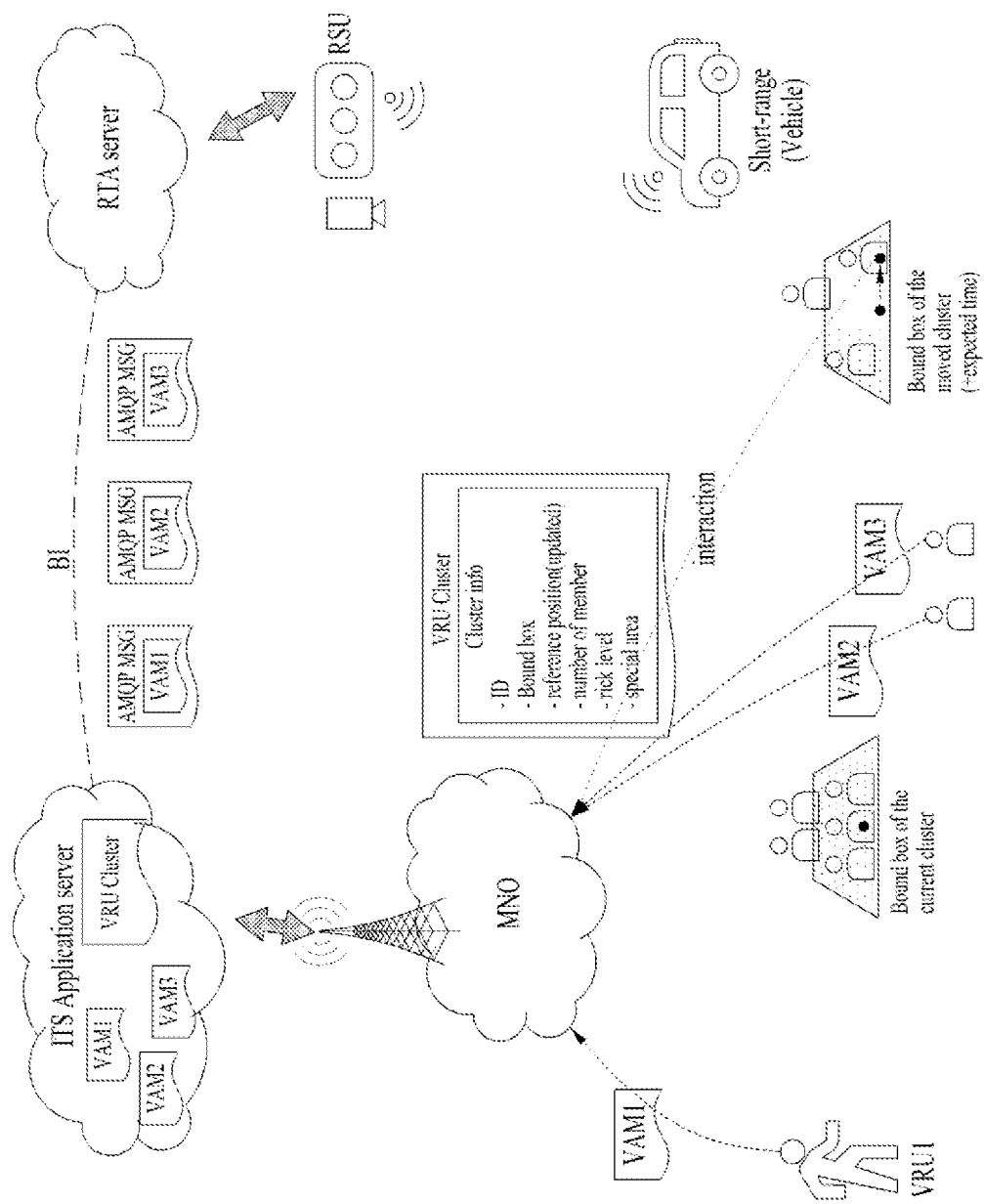

Referring to FIG. 24, as described above, the ITS application server may transmit an interaction message including information on a boundary box area (i.e., next cluster area) when the cluster moves after the expected time, the position of the cluster leader (i.e., reference position), the position of a next cluster leader, the number of VRU devices included in the cluster, a risk level, a special area, etc. Since the information included in the interaction message is estimated based on messages received from the VRU devices, the information may have some errors.

To correct these errors, a VRU device located (adjacent to) the reference position (or a VRU device located (adjacent to) the leader position of the next cluster area) may generate VRU cluster information based on information on its position and dynamics after the expected time and then transmit the VRU cluster information to the ITS application server. The ITS application server may correct the next cluster area and leader position estimated by the ITS application server based on the VRU cluster information. The ITS application server may transmit the corrected cluster information to the RTA server and/or VRU devices.

Among the VRU devices, a UE determined to be out of the next cluster area after the expected time designated by the server may resume transmission of its own message.

Figure 25:
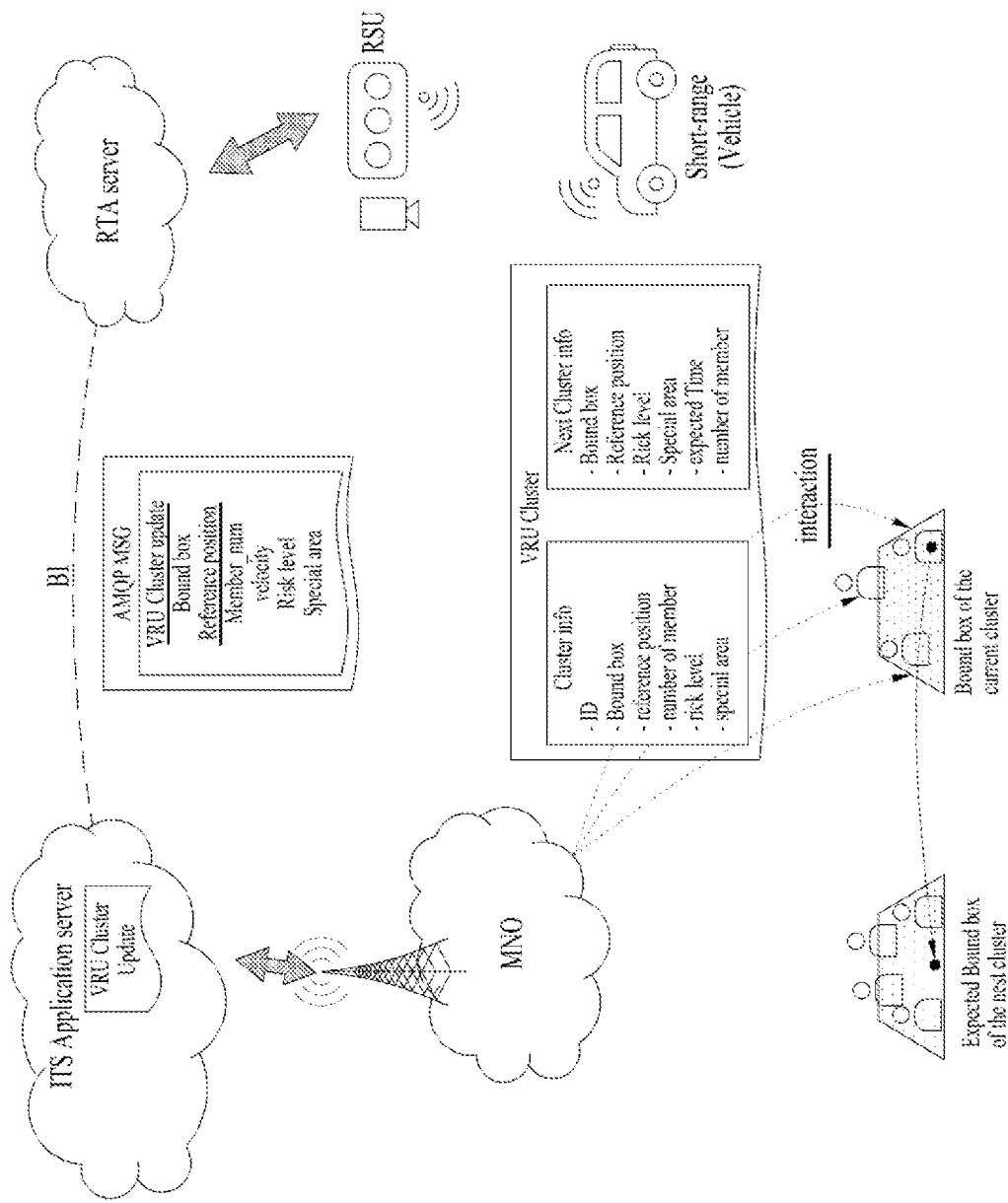

Referring to FIG. 25, the ITS application server may receive from the leader VRU, which is the cluster leader, a cluster message including information on a VRU cluster area related to the next cluster area expected by the leader VRU. The ITS application server may update cluster information on the next cluster area expected by the ITS application server based on the cluster message. The ITS application server may transmit the cluster information on the updated cluster area to the RTA server.

The ITS application server may continuously perform clustering by receiving and analyzing a plurality of messages from the VRU devices. The ITS application server may generate a new cluster or update the current cluster. The ITS application server may transmit an interaction message including cluster information on the new cluster and/or cluster information on the updated cluster to the VRU devices.

Figure 26:
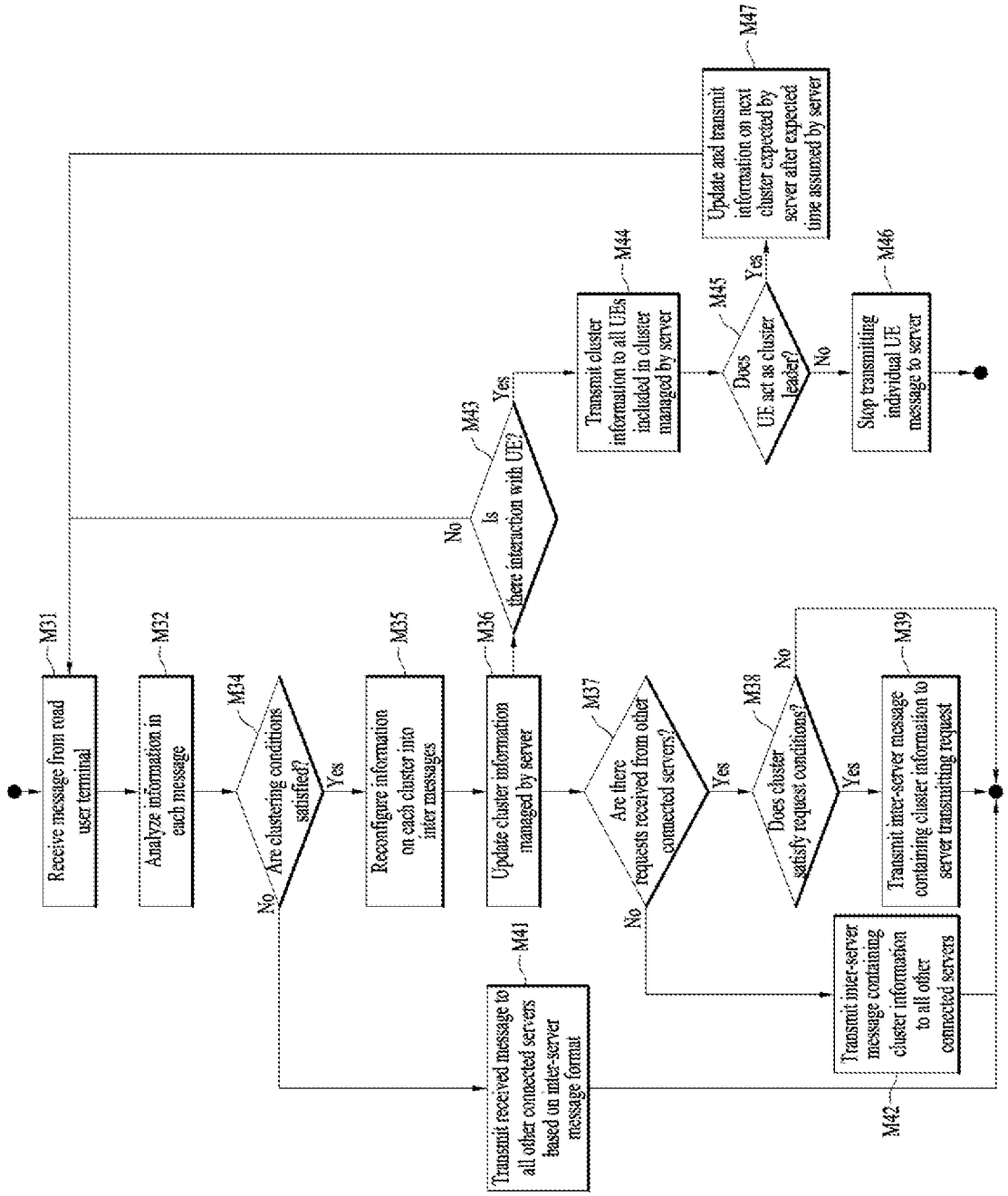
FIG. 26 is a diagram for explaining a method of performing operations related to clustering between an ITS application server and VRU devices.

FIG. 26 is a diagram for explaining a method of performing operations related to clustering between the ITS application server and VRU devices.

Referring to FIG. 26, the ITS application server may receive a plurality of VRU messages from load users or VRU devices (or UEs) (M31). The ITS application server may analyze the plurality of VRU messages to obtain position and dynamics information from each of the plurality of VRU messages (M32). The ITS application server may determine whether the plurality of VRU messages satisfy the above-described cluster conditions based on the analysis results (M34).

When VRU messages among the plurality of VRU messages satisfy the cluster conditions, the ITS application server may reconfigure a first message (or inter-server exchange message) by clustering the VRU messages into one inter-server message (M35). In this case, if the ITS application server has current cluster information related to the clustering, the ITS application server may update the current cluster information based on the VRU messages (M36). Depending on whether the ITS application server receives a request message requesting cluster information on a specific cluster area from servers connected to the ITS application server, the ITS application server may determine targets to which the ITS application server transmits the updated cluster information (M37). When the request message is received, the ITS application server may determine whether the generated cluster is related to the request message (M38). If the generated cluster is related to the request message, the ITS application server may transmit the updated cluster information to a server who transmits the request message (M39).

Alternatively, if the ITS application server generates a plurality of clusters, the ITS application server may transmit cluster information only on a cluster related to the request message among the plurality of clusters to the server that transmits the request message.

Among the plurality of VRU messages, each VRU message that does not satisfy the clustering conditions may be separately reconfigured into the first message and then transmitted (M41). Alternatively, if there is another server that transmits no request message, the ITS application server may transmit the updated cluster information to the other server (M42). Alternatively, if the ITS application server generates the plurality of clusters, the ITS application server may transmit cluster information on each of the plurality of clusters to the other server that transmits no request message.

On the other hand, if the generated cluster is not related to the request message, the ITS application server may not transmit the updated cluster information to the server that transmits the request message.

Alternatively, the ITS application server may determine to transmit an interaction message including the cluster information to VRU devices included in the cluster, depending on whether an interaction operation with the VRU devices is required (M43). When the ITS application server performs the interaction operation with the VRU devices, the ITS application server may transmit the interaction message including the cluster information to corresponding VRU devices (M44). Upon receiving the interaction message, the VRU devices may determine whether the VRU devices become a leader VRU device having a position corresponding to a reference position (or leader position) included in the interaction message (M45). The VRU devices may stop transmitting individual messages (M46). The leader VRU device among the VRU devices may also stop transmitting messages. However, after an expected time included in the interaction message elapses, the leader VRU device may generate updated cluster information on the current cluster based on information on its position and dynamics and transmit the updated cluster information to the ITS application server (M47).

According to the clustering and interaction operations, each of multiple VRU devices may minimize transmission of periodic VRU messages and also greatly reduce battery consumption by stopping the VRU message transmission depending on clustering results. In addition, the amount of data exchanged between the servers and/or the amount of data exchanged between the server and multiple UEs may be greatly reduced, thereby optimizing the communication environment between the server and multiple VRU devices and/or communication environment between the servers.

Figure 27:
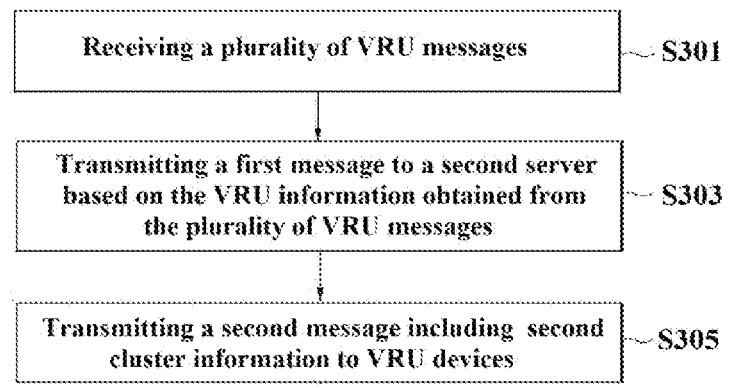
FIG. 27 is a diagram for explaining a method in which a first server transmits cluster information on a plurality of received VRU messages.

FIG. 27 is a diagram for explaining a method in which a first server transmits cluster information on a plurality of received VRU messages.

The operations described below are based on the methods described above with reference to FIGS. 11 to 26, and the following operations: filtering and clustering of VRU messages and interaction with VRU devices are assumed.

Referring to FIG. 27, the first server may receive a plurality of VRU messages (S301). The plurality of VRU messages may be received from a plurality of VRU devices over a Uu interface.

Next, the first server may obtain VRU information about the VRU devices from the plurality of VRU messages and transmit the VRU information to a second server in a first message, which is an inter-server message, based on the obtained VRU information (S303). Herein, the first server may correspond to the above-described ITS application server, and the second server may correspond to the above-described RTA server that controls traffic related systems such as RSUs. In addition, the first message may be the inter-server exchange message exchanged between servers based on the AMQP.

Alternatively, when there are VRU messages satisfying predetermined cluster conditions (at least one of the above-described conditions: conditions i) to iv)) among the plurality of VRU messages, the first server may merge the VRU messages into one piece of first cluster information and then transmit the first cluster information to the second server in the first message, instead of transmitting individual VRU information for the VRU messages.

Specifically, when there are VRU messages satisfying the cluster conditions among the plurality of VRU messages, the first server may generate the first cluster information by integrating VRU information obtained from the VRU messages satisfying the cluster conditions. In this case, instead of directly providing the VRU information for the VRU messages to the second server, the first server may provide the first cluster information other than the VRU information for the VRU messages to the second server.

That is, as described above, the first server may generate the first cluster information for the VRU messages satisfying the cluster conditions among the plurality of VRU messages and transmit the first message including the first cluster information to the second server. On the other hand, the first server may transmit individual VRU information for VRU messages that do not satisfy the cluster conditions among the plurality of VRU messages to the second server in the first message.

In this case, whether the cluster conditions are satisfied may be determined based on a predetermined threshold distance and a predetermined threshold number as described above in conditions i) to iv). For example, if the number of VRU messages including information on a position within the predetermined threshold distance is more than or equal to the predetermined cluster threshold number, the first server may determine that some of the plurality of VRU messages satisfy the cluster conditions. The first server may generate the first cluster information for the VRU messages.

In this case, the first cluster information may include a first cluster area, cluster member information, and cluster mobility information. The first cluster area may be set as an area capable of covering the positions of all VRU devices included in the VRU messages. The cluster member information may be information about the number and types of VRU devices transmitting the VRU messages. The cluster mobility information may be information about the average moving speed and average moving direction of the VRU devices.

Alternatively, as described above, the first server may be connected to a plurality of servers. The first server may receive a request message related to clustering from at least one server among the plurality of servers. The request message may include geographical information on an area desired by the at least one server, information on Vehicle-Role and/or stationType desired to receive among the plurality of VRU messages, etc. In this case, the first server may specify, as the second server, a server that transmits a request message including information on an area corresponding to the first cluster area.

In addition, the first server may specify a server that transmits no request message as a server to which the first server is to transmit the first message. On the other hand, the first server may stop transmitting the first message or may not transmit the first message to a server that transmits a request message requesting a cluster having a different area from the first cluster area.

That is, the first server may specify a server that transmits a request message requesting clustering for an area corresponding to the first cluster area or a server that transmits no request message to the second server to which the first server is to transmit the first message.

Next, based on whether the first message includes the first cluster information, the first server may transmit a second message including second cluster information to VRU devices related to the first cluster information (S305).

Specifically, when there are VRU messages satisfying the cluster conditions, the first server may transmit the second message including the second cluster information to the VRU devices transmitting the VRU messages satisfying the cluster conditions. On the other hand, the first server may not transmit the second message to VRU devices transmitting VRU messages that do not satisfy the cluster conditions.

That is, only when the first message includes the first cluster information, the first server may transmit the second message only to the VRU devices transmitting the VRU messages related to the first cluster information.

The second cluster information may be generated based on the first cluster information. The second cluster information may further include not only the first cluster information but also information about an expected time and a second cluster area expected at the expected time. In this case, the second message may correspond to the above-described interaction message.

Specifically, the first server may estimate the second cluster area where the cluster is to be located after a specific time (or expected time) based on the cluster mobility information (or mobility information on each of the VRU devices). The first server may transmit the second cluster information including the first cluster information, the expected time, and/or information on the second cluster area to the VRU devices (i.e., VRU devices located in the first cluster area) in the second message.

In this case, the first server may configure the VRU devices to stop transmission of individual VRU messages until the expected time by transmitting the second message to the VRU devices. That is, when the VRU devices determine that they are located in the first cluster area based on the second cluster information after receiving the second message, the VRU devices may stop transmitting their individual VRU messages until the expected time.

Alternatively, the second cluster information may further include information about a reference position for specifying a representative VRU device configured to transmit a cluster message as a representative of the VRU devices located in the first cluster area. To this end, the VRU devices may determine whether their positions are located within the predetermined threshold distance from the reference position included in the second message. If a VRU device determines that it is located within the predetermined threshold distance from the reference position, the VRU device may transmit the cluster message as the representative VRU device.

The cluster message may include position information and mobility information related to the representative VRU device for updating the first cluster area. The cluster message may be transmitted after the expected time or according to a predetermined cycle. The reference position may be the center position of the first cluster area or the position closest to the second cluster area within the first cluster area based on the mobility information on the VRU devices.

Alternatively, the second cluster information may further include information on the reference position for specifying the representative VRU device and information on a specific speed range. In this case, among the VRUs, a VRU located within the predetermined threshold distance from the reference position included in the second message and having a moving speed within the specific speed range may be specified as the representative VRU. The specific speed range may be determined based on the average moving speed of the VRUs included in the first cluster area. The reason for this is to specify a VRU device likely to be located in the second cluster area at the expected time as the representative VRU device.

In addition, the VRU devices may determine whether to resume transmission of individual VRU messages after the expected time based on the second cluster area included in the second cluster information.

Specifically, among the VRU devices receiving the second message, a VRU device whose location is located within the second cluster area at the expected time may continuously stop the transmission of individual VRU messages. On the contrary, among the VRU devices, a VRU device whose location is not located within the second cluster area at the expected time may resume the transmission of individual VRU messages.

The first server may determine that if a VRU device among the VRUs related to the cluster information transmits an individual VRU message after the expected time, the VRU device leaves the cluster. In this case, the first server may update the first cluster information by removing information on the VRU device transmitting the individual VRU message from cluster members.

The first server may update the first cluster area based on the cluster message. For example, the first server may adjust the first cluster area such that the first cluster area matches the position of the representative VRU based on the position and mobility information on the representative VRU included in the cluster message. The first server may update the first cluster information and/or the second cluster information to include the adjusted first cluster area.

Accordingly, VRU messages satisfying the cluster conditions may be clustered into a single cluster, and information on the single cluster may be provided to other servers rather than VRU information on each of the VRU messages, thereby greatly reducing the amount of data exchanged over an interface between servers. In addition, the amount of data exchanged between a server and VRU devices may be minimized based on interaction between the server and UEs, thereby minimizing battery consumption of the VRU devices and improving communication environments based on the Uu interface.

Communication System Example to Which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 28:
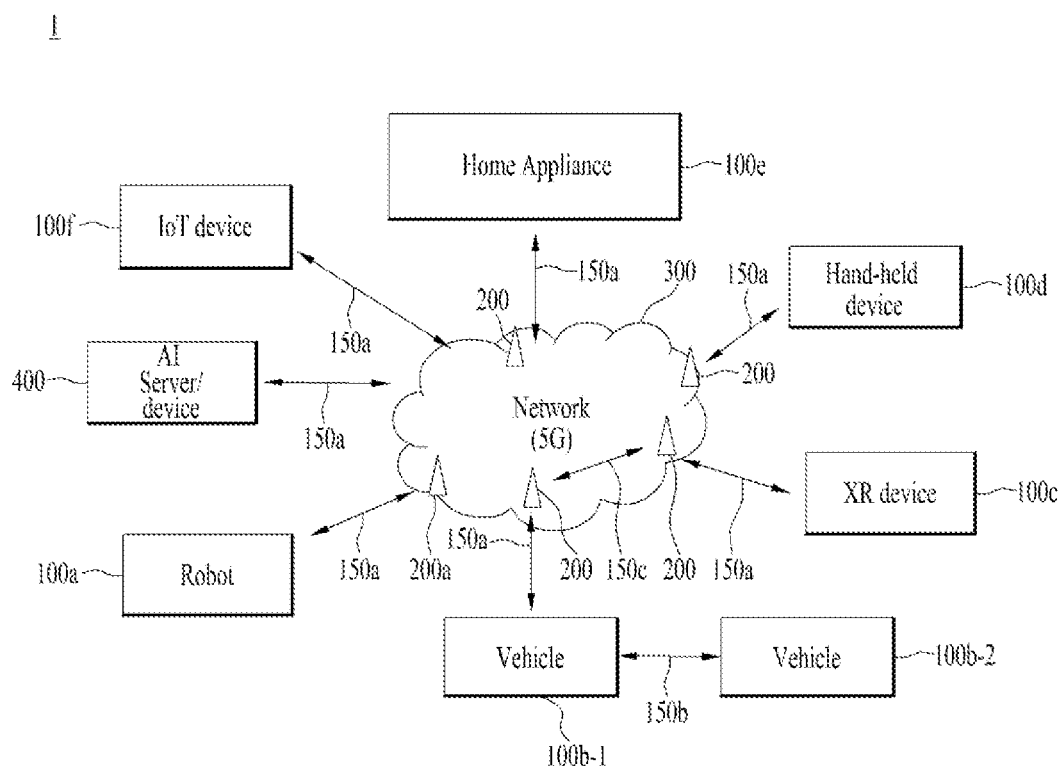
FIG. 28 illustrates a communication system applied to the present disclosure.

FIG. 28 illustrates a communication system applied to the present disclosure.

Referring to FIG. 28, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to Which the Present Disclosure is Applied

Figure 29:
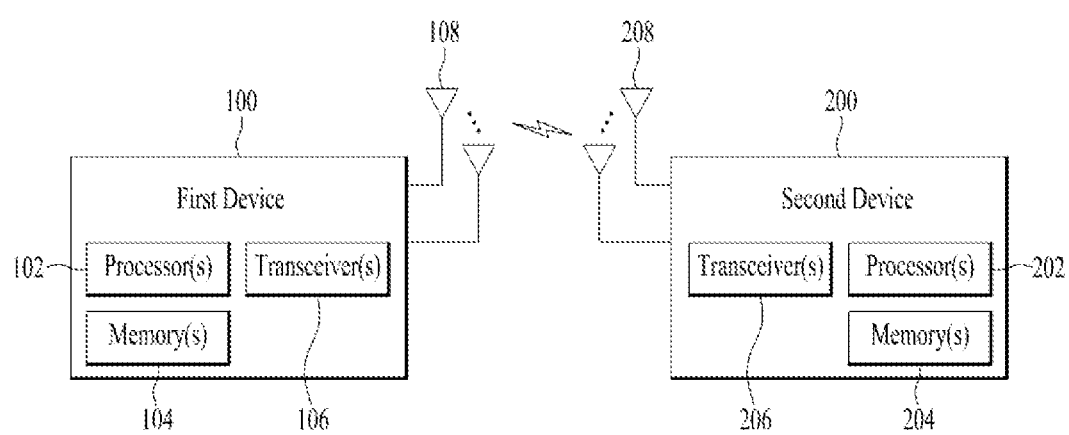
FIG. 29 illustrates wireless devices applicable to the present disclosure.

FIG. 29 illustrates a wireless device applicable to the present disclosure.

Referring to FIG. 29, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 28.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, a UE may include the processor(s) 102 connected to the RF transceiver and the memory(s) 104. The memory(s) 104 may include at least one program for performing operations related to the embodiments described above with reference to FIGS. 11 to 27.

The processor(s) 102 may be configured to: control the RF transceiver to receive a plurality of VRU messages; transmit a first message to a second server based on VRU information obtained from the plurality of VRU messages; and transmit the second message including second cluster information to VRU devices based on the first message including first cluster information. When there are VRU messages satisfying cluster conditions among the plurality of VRU messages, the first message may include the first cluster information on a cluster formed based on the VRU messages. The second cluster information may include information on a first cluster area of the cluster and information on an expected time and a second cluster area related to the expected time.

Alternatively, a chipset including the processor(s) 102 and memory(s) 104 may be configured. The chipset may include: at least one processor; and at least one memory operably connected to the at least one processor and configured to, when executed, cause the at least one processor to perform operations.

The processor(s) 102 included in the chipset may be configured to: receive a plurality of VRU messages; transmit a first message to a second server based on VRU information obtained from the plurality of VRU messages; and transmit the second message including second cluster information to VRU devices based on the first message including first cluster information. When there are VRU messages satisfying cluster conditions among the plurality of VRU messages, the first message may include the first cluster information on a cluster formed based on the VRU messages. The second cluster information may include information on a first cluster area of the cluster and information on an expected time and a second cluster area related to the expected time.

Alternatively, there is provided a computer-readable storage medium including at least one computer program configured to cause at least one processor to perform operations. The operations may include: receiving a plurality of VRU messages; transmitting a first message to a second server based on VRU information obtained from the plurality of VRU messages; and transmitting the second message including second cluster information to VRU devices based on the first message including first cluster information. When there are VRU messages satisfying cluster conditions among the plurality of VRU messages, the first message may include the first cluster information on a cluster formed based on the VRU messages. The second cluster information may include information on a first cluster area of the cluster and information on an expected time and a second cluster area related to the expected time.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to Which the Present Disclosure is Applied

Figure 30:
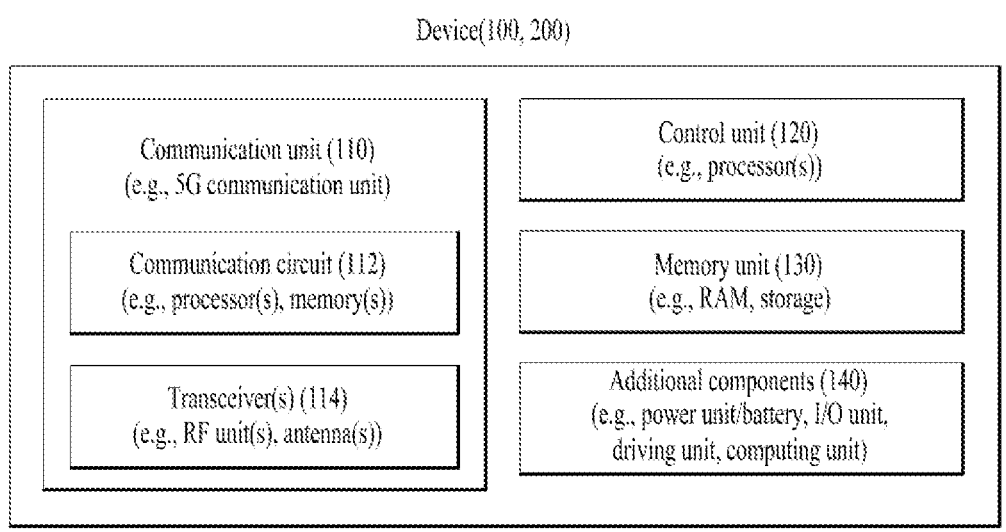
FIG. 30 illustrates another example of a wireless device to which the present disclosure is applied.

FIG. 30 illustrates another example of a wireless device applied to the present disclosure. The wireless device may be implemented in various forms according to a use-case/service (refer to FIG. 28)

Referring to FIG. 30, wireless devices 100 and 200 may correspond to the wireless devices 100 and 200 of FIG. 29 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 29. For example, the transceiver(s) 114 may include the one or more transceivers 106 and 206 and/or the one or more antennas 108 and 208 of FIG. 29. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 28), the vehicles (100b-1 and 100b-2 of FIG. 28), the XR device (100c of FIG. 28), the hand-held device (100d of FIG. 28), the home appliance (100e of FIG. 28), the IoT device (100f of FIG. 28), a digital broadcast terminal, a hologram device, a public safety device, an MTC device, a medicine device, a fintech device (or a finance device), a security device, a climate/environment device, the AI server/device (400 of FIG. 28), the BSs (200 of FIG. 28), a network node, etc. The wireless device may be used in a mobile or fixed place according to a use-example/service.

In FIG. 30, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 31:
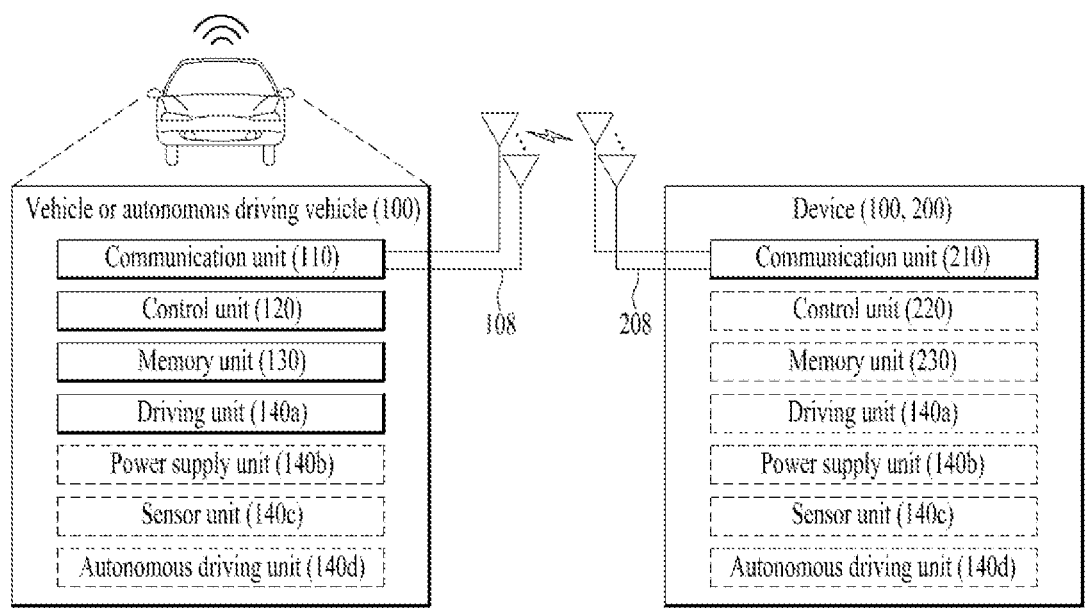
FIG. 31 illustrates a vehicle or an autonomous driving vehicle applied to the present disclosure.

Examples of Vehicles or Autonomous Vehicles to Which the Present Disclosure is Applied FIG. 31 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 31, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 30, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the acquired data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The above-described embodiments of the present disclosure are applicable to various mobile communication systems.

The invention claimed is:

1. A method of transmitting, by a first server, a second message in a wireless communication system, the method comprising:
   receiving a plurality of vulnerable road user (VRU) messages;
   transmitting a first message to a second server based on VRU information obtained from the plurality of VRU messages; and
   transmitting the second message comprising second cluster information to VRU devices based on the first message comprising first cluster information,
   wherein, based on a presence of VRU messages satisfying cluster conditions among the plurality of VRU messages, the first message comprises the first cluster information on a cluster formed based on the VRU messages, and
   wherein the second cluster information comprises information on a first cluster area of the cluster and information on an expected time and a second cluster area related to the expected time.

2. The method of claim 1, wherein the expected time is to specify a period during which VRU devices located in the first cluster area stop transmitting VRU messages.

3. The method of claim 1, wherein the second cluster information further comprises information on a reference position for specifying a representative VRU device configured to transmit a cluster message as a representative of VRU devices located in the first cluster area.

4. The method of claim 3, wherein the first cluster information is updated based on the cluster message transmitted by the representative VRU device.

5. The method of claim 3, wherein the cluster message comprises cluster information related to the second cluster area and is received at a point in time corresponding to the expected time.

6. The method of claim 3, wherein the second cluster area is an area related to determining whether the VRU devices resume transmission of VRU messages after the expected time.

7. The method of claim 1, wherein based on a number of VRU messages each comprising information on a position within a predetermined threshold distance being greater than or equal to a cluster threshold number, the first cluster area is configured based on position information in the VRU messages.

8. The method of claim 1, wherein the first message is an advanced message queuing protocol (AMQP) message exchanged between servers.

9. The method of claim 1, wherein the first server is configured to specify the second server to which the first server is to transmit the first message, based on clustering request messages received from a plurality of servers connected to the first server.

10. The method of claim 9, wherein the first message is not transmitted to a server transmitting a request message for a cluster area different from the first cluster area among the plurality of servers.

11. A method of receiving, by a device, cluster information from a first server in a wireless communication system, the method comprising:
    transmitting a VRU (vulnerable road user) message to the first server;
    receiving a second message comprising the cluster information from the first server; and
    stopping the transmission of the VRU message based on the cluster information,
    wherein the cluster information comprises information on a first cluster area configured based on predetermined cluster conditions and information on an expected time and a second cluster area related to the expected time, and
    wherein based on a position of the device being within the first cluster area, the transmission of the VRU message stops until the expected time.

12. A first server configured to transmit a second message in a wireless communication system, the first server comprising:
    a radio frequency (RF) transceiver; and
    a processor connected to the RF transceiver,
    wherein the processor is configured to:
    control the RF transceiver to receive a plurality of vulnerable road user (VRU) messages;
    transmit a first message to a second server based on VRU information obtained from the plurality of VRU messages; and
    transmit the second message comprising second cluster information to VRU devices based on the first message comprising first cluster information,
    wherein, based on a presence of VRU messages satisfying cluster conditions among the plurality of VRU messages, the first message comprises the first cluster information on a cluster formed based on the VRU messages, and
    wherein the second cluster information comprises information on a first cluster area of the cluster and information on an expected time and a second cluster area related to the expected time.

* * * * *